US006685978B1

(12) United States Patent
Hauksson

(10) Patent No.: US 6,685,978 B1
(45) Date of Patent: Feb. 3, 2004

(54) GELLED AND GELLABLE COMPOSITIONS FOR FOOD PRODUCTS

(75) Inventor: Helgi Hauksson, Koege (DK)

(73) Assignee: CP Kelco APS, Wilmington, DE (US)

( * ) Notice: Subject to any disclaimer, the term of this patent is extended or adjusted under 35 U.S.C. 154(b) by 0 days.

(21) Appl. No.: 09/542,991

(22) Filed: Apr. 4, 2000

(51) Int. Cl.[7] .............................................. A23L 1/0524
(52) U.S. Cl. ........................ 426/573; 426/574; 426/575; 426/576; 426/577; 426/578; 426/651; 426/658; 426/661
(58) Field of Search ................................ 426/573, 574, 426/575, 576, 577, 578, 658, 651, 661

(56) References Cited

U.S. PATENT DOCUMENTS

| 2,786,764 A | 1/1957 | Rivoche ....................... 99/131 |
| 2,992,925 A | 7/1961 | Green et al. ................... 99/131 |
| 3,506,455 A | 4/1970 | Savage et al. ................. 99/107 |

(List continued on next page.)

FOREIGN PATENT DOCUMENTS

| EP | 1596294 | 3/1977 |
| EP | 0266141 | 10/1987 |
| EP | 0291228 | 11/1988 |
| EP | 0345886 | 6/1989 |
| EP | 0501758 | 9/1992 |
| EP | 0758529 | 2/1997 |
| EP | 1078578 | 2/2001 |
| FR | 2213021 | 8/1974 |
| FR | 2738460 | 3/1997 |
| GB | 1439941 | 6/1976 |
| GB | 2137066 | 10/1984 |
| JP | 57167333 | 10/1982 |
| JP | 59-51734 | 3/1984 |
| JP | 63-12269 | 1/1988 |
| JP | 6-98720 | 4/1994 |
| JP | 9-308461 | 12/1997 |
| JP | 10-99051 | 4/1998 |
| JP | 10165115 | 6/1998 |
| WO | 96/02151 | 2/1996 |

OTHER PUBLICATIONS

Zheng et al., "Effect of phosphate and pectin on quality and shelf–life of marinated chicken breast", Journal of Food Quality, 22(5) 553–564, 1999.
English Language Translation of JP 10–165115.
English Language Translation of JP 57–167333.
English Language Abstract of JP 59–51734.
English Language Abstract of JP 63–12269.
English Abstract of DK 9002578A.
Research Disclosure, Mar. 1991, p. 212, "Application of Gellan Gum to Meat Systems", No. 323103.
Copenhagen Pectin A/S Publication, Handbook Meat, Poultry and Fish, Chaters 1–11, 13 and 15 (1995).
Database WPI, Section Ch, Week 199648, Derwent Publications Ltd., London, GB; Class D13, AN 1996–483900, XP002181262, Nutrasweet Kelco Co.: "The formationof a fluid gel system—by careful manipulation of a gellan gum solution containing sodium".
D. Albers: "Einstatz von Carrageenan fur innovative Kochpokelwaren", Fleischwirtschaft, vol. 77, No. 9, 1997, pp. 781–783, 816 XP001034289, Frankfort, DE, ISSN: 0015–363X.

Primary Examiner—Nina Bhat
(74) Attorney, Agent, or Firm—Greenblum & Bernstein, P.L.C.

(57) ABSTRACT

Processes and compositions for treating food products comprising adding to the food product an aqueous composition which is gellable in the food product. The process can include wherein the composition comprises a thixotropic gel which has been shear thinned, and is added to the food product in a shear thinned condition, as well as wherein the aqueous composition comprises a composition that does not form a gel externally of the food product, and which composition is gellable in the food product.

78 Claims, 3 Drawing Sheets

U.S. PATENT DOCUMENTS

| | | |
|---|---|---|
| 3,565,539 A | 2/1971 | Russa |
| 3,644,128 A | 2/1972 | Lipner |
| 3,683,789 A | 8/1972 | Beasley |
| 3,798,334 A | 3/1974 | Earl et al. .................. 426/58 |
| 3,922,357 A | 11/1975 | Townsend |
| 3,956,173 A | 5/1976 | Towle ...................... 252/316 |
| 3,973,008 A | 8/1976 | Sugiyama et al. |
| 3,982,003 A | 9/1976 | Mitchell et al. ............... 426/1 |
| 4,089,979 A | 5/1978 | Jackson ..................... 426/69 |
| 4,143,172 A | 3/1979 | Mitchell et al. ............ 426/532 |
| 4,194,013 A | 3/1980 | Rehacek et al. |
| 4,268,533 A | 5/1981 | Williams et al. |
| 4,303,681 A | 12/1981 | Challen et al. |
| 4,312,891 A | 1/1982 | Eisfeldt ..................... 426/573 |
| 4,348,420 A | 9/1982 | Lynch et al. |
| 4,381,316 A | 4/1983 | Brotsky et al. |
| 4,384,004 A | 5/1983 | Cea et al. |
| 4,402,987 A | 9/1983 | von Lersner et al. |
| 4,406,831 A | 9/1983 | Atteck |
| 4,407,831 A | 10/1983 | Swartz |
| 4,717,713 A | 1/1988 | Zatz et al. |
| 4,746,522 A | 5/1988 | Wofford et al. |
| 4,786,515 A | 11/1988 | Miller et al. |
| 4,826,700 A | 5/1989 | Bayerlein et al. |
| 4,877,621 A | 10/1989 | Ardaillon et al. |
| 4,943,445 A | 7/1990 | Norton et al. ............... 426/573 |
| 4,988,524 A | 1/1991 | Obata et al. |
| 4,996,067 A | 2/1991 | Kobayashi et al. |
| 5,039,538 A | 8/1991 | Tamaki et al. |
| 5,053,237 A | 10/1991 | Hendricks et al. |
| 5,164,213 A | 11/1992 | Bonkowski |
| 5,217,741 A | 6/1993 | Kawachi et al. |
| 5,232,723 A | 8/1993 | Bisson et al. |
| 5,250,312 A | 10/1993 | Mason et al. |
| 5,279,844 A | 1/1994 | Wesdorp et al. |
| 5,324,531 A | 6/1994 | Hoefler et al. ............... 426/573 |
| 5,380,545 A | 1/1995 | Mason et al. |
| 5,458,904 A | 10/1995 | Zolper ........................ 426/96 |
| 5,508,054 A | 4/1996 | Kretow et al. ............... 426/573 |
| 5,508,055 A | 4/1996 | Rubow et al. ............... 426/573 |
| 5,529,801 A | 6/1996 | Morano |
| 5,626,899 A | 5/1997 | Payne et al. |
| 5,690,990 A | 11/1997 | Bonner |
| 5,741,533 A | 4/1998 | Lorenzo Moore et al. |
| 5,858,442 A | 1/1999 | Payne et al. |
| 5,869,029 A | 2/1999 | Graff-Andersen et al. |
| 5,869,118 A | 2/1999 | Morris et al. |
| 5,874,102 A | 2/1999 | LaJoie et al. |
| 5,986,164 A | 11/1999 | Kershaw et al. |
| 6,187,366 B1 * | 2/2001 | Ensor et al. ................ 426/641 |

\* cited by examiner

Viscosities of solutions where first there is dissolved 0,15% - 2,00% NaCl, then 5% Genugel X-7524, followed by 2% NaCl.
From values in table: 7F.

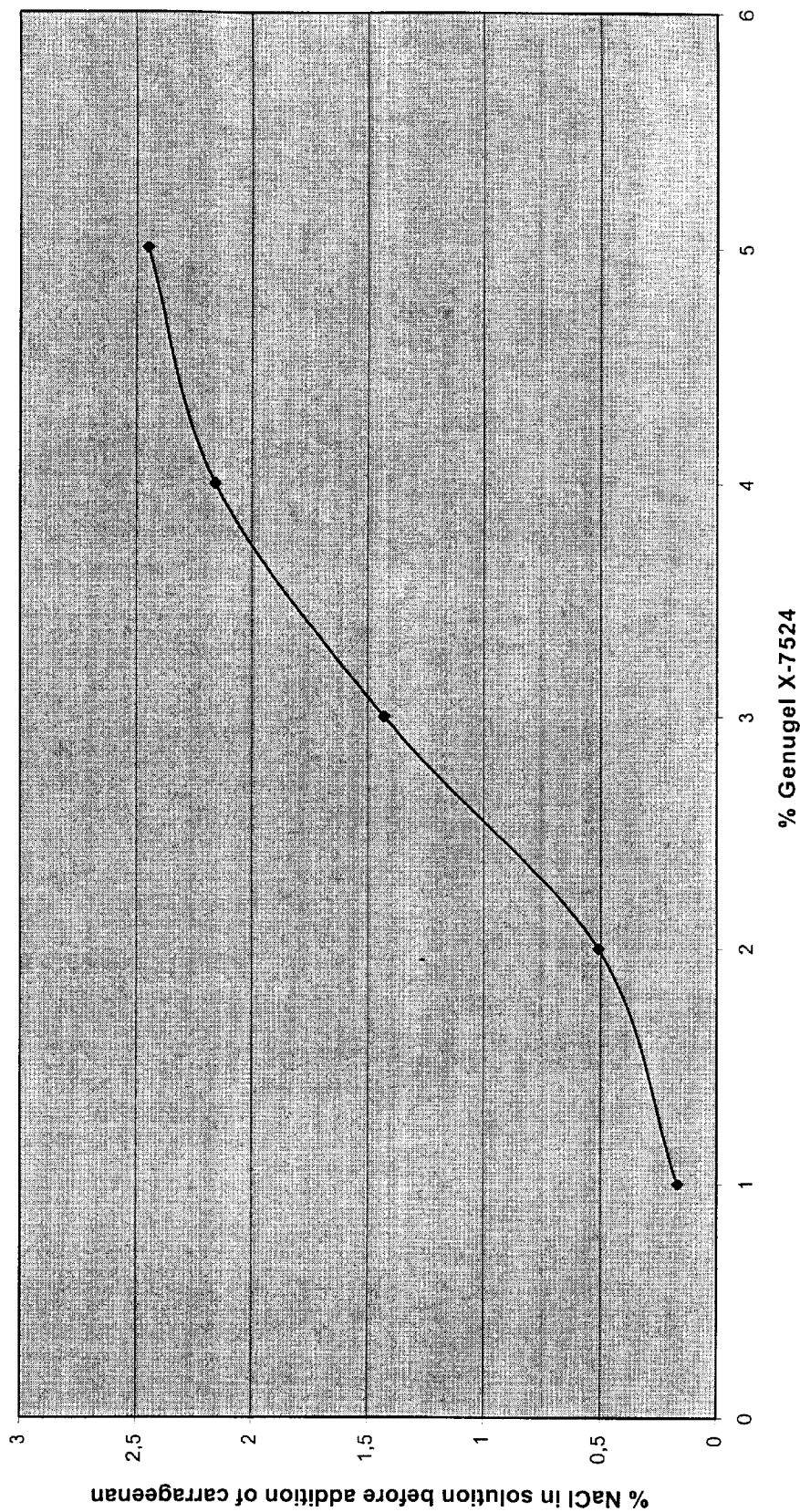
Figure: 2
Gel - In - Place
Food treating compostion with viscosity of 500 CPS extrapolated from values in table: 7F

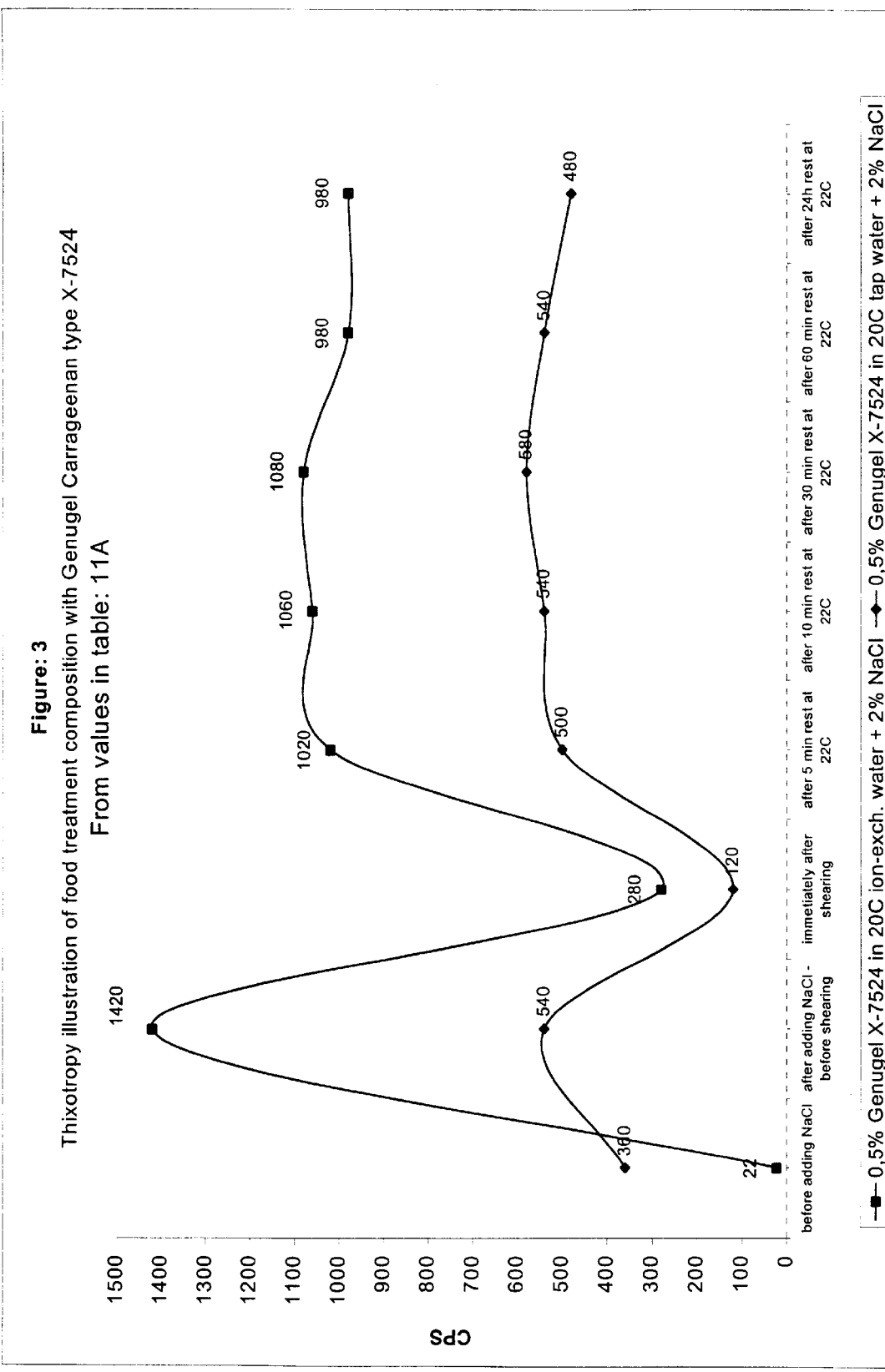

GELLED AND GELLABLE COMPOSITIONS FOR FOOD PRODUCTS

BACKGROUND OF THE INVENTION

1. Field of the Invention

The present invention relates to gel-in-place compositions for food products, as well as to food products including the gel-in-place compositions. The present invention also relates to the preparation, storage, distribution and cooking of food products without excessive seepage of liquid from the food products. Moreover, the food products according to the present invention are tender and have excellent texture.

2. Discussion of Background Information

In the curing of meat cuts, the dressed meat is usually injected with a brine solution, usually by multi-needle injection or by stitch or artery pumping, followed in sequence by resting, tumbling and/or massaging and finally cooking. Alternatively the meat cuts can simply be tumbled or massaged in the brine solution. Typical pickling procedures are disclosed in U.S. Pat. Nos. 3,565,539, 3,683,789, 3,922,357.

In the injection of a solution, brine or marinade into the food product, the food product should most desirably be cooked at the injection site or near the injection site, because there is a tendency for the injected brine to leak out of distributed uncooked food products, in either fresh, chilled or frozen condition, during distribution or sale or at the final customer. For example, in fresh and chilled products seeping out of the brine can occur during distribution and sales, whereby the products loose much of their consumer appeal due to excess liquid present in the packaging. This can lead to a high incidence of returned products from distribution and sales end of the meat packaging and shipping business, such as supermarkets, meat processing plants, and other types of food handling locations.

There is also a need to reduce the liquid seepage in food products associated with larger packaging which is processed at a distributor or sale location, such as where the originally packaged food product is sold in smaller units than the original packaging. Distributors and resellers, such as supermarkets, often feel cheated when there is excess liquid in the packaging and therefore often request a reduction in price for excess liquid or at least what corresponds to the weight of the excess liquid.

As for frozen food products, liquid seepage can show up as excess liquid present in the form of higher than desired natural thawing loss. This undesired thawing loss of liquids can occur at or during distribution and sales, or when sold frozen, and the final consumer thaws the product. For example, a consumer that experiences excessively high thawing loss in a food product may not buy the same product again.

Food products into which solutions are incorporated also normally have the problem of excess cooking loss. Thus, for example, the incorporated solution can leak out in an unacceptably high manner during cooking, creating higher than acceptable cooking loss. Thus, while injected food products can also be cooked at a consumer location, instead of at or near the site of injection, there is a need to reduce seepage of the injected composition from the food products during shipping, as well as a need to reduce cooking loss during food preparation.

Moreover, it is noted that solutions that are incorporated into food products do not always increase the juiciness and/or tenderness of the cooked food product. Thus, many conventional solutions that are incorporated into food products will, for the most part, leak out during cooking, whereby such solutions will not significantly contribute to juiciness and/or tenderness of the cooked food product.

It is noted that in the prior art, it is known to mix brine and gelling polysaccharides, such as carrageenan or gellan, and the resulting solution can be injected into food products. Typically the brines used in such pickling processes will comprise one or more inorganic salts, particularly chlorides (sodium chloride), phosphates, nitrates or nitrites, organic compounds such as sugar, amino acids, protein extracts, and/or flavoring agent, natural as well as synthetic, spices (fresh, dried, extracted, etc.) sauces, wines, spirits, liquors, and any other flavor contributing and/or enhancing component and tenderizing agents, for example, enzymes such as papain, bromealin and other proteases, or foods, ingredients or compounds containing these enzymes, any type of animal or vegetable proteins in their natural or modified form, such as gelatine, collagen, egg proteins, milk proteins, soy proteins, and wheat proteins, any type of starches native or modified.

In prior art processes, it is the objective of the mixing of brine and polysaccharide so that the resulting solution can be injected into the meat utilizing normal injection equipment. Thus, in forming the injectable solution, salts are first added and then the polysaccharide is added. In this manner, the solution can be injected. In this regard, it is noted that salt generally decreases the solubility of polysaccharides. The more salt in the solution the higher the possible concentration of polysaccharide that can be added while still enabling injection. Thus, the prior art seeks to maintain a sufficiently high concentration of salt in the solution prior to addition of the polysaccharide in order to enable injection while maintaining the polysaccharide undissolved before cooking. This conventional method for making up a brine solution is described in Copenhagen Pectin A/S publication, Handbook for the Meat Processing Industry, Chapter 3, page 3–28 (1995).

Addition of a dry mix of carrageenan and salt is disclosed by Mason, et al. in U.S. Pat. No. 5,380,545. The efficacy of the invention disclosed in U.S. Pat. No. 5,380,545 results from the fact that the salt in combination with carrageenan provides a rapid infusion system into the foodstuff matrix. Specifically, the salt extracts a portion of the protein at the surface of the foodstuff and opens surface pores on the foodstuff thereby allowing the carrageenan to be rapidly assimilated into the matrix. The carrageenan will then be strategically placed to hold and bind water during the cooking process. Thus, this invention draws on the insolubility of carrageenan in the presence of salt.

Accordingly, there is a need to provide compositions that are easily injectable and/or diffusible. There is also a need for compositions that can be added to food products, and the food products can be shipped while avoiding excessive liquid seepage. There is also a need for compositions that can be added to food products that enable the food product to be handled without unacceptable liquid seepage during handling. Still further, there is a need for compositions that can be added to food products in order to permit the food product to be cooked without unacceptable weight loss. Still further, there is a need, especially with red meats, and breast meat of turkey and chicken, to maintain these food products tender and juicy upon cooking, even with low levels of food treating composition incorporated therein.

SUMMARY OF THE INVENTION

The present invention concerns compositions that form gels in food products.

The present invention also concerns compositions that can be added to food products in order to produce food products with reduced liquid seepage. More specifically, the compositions according to the present invention can be used to reduce liquid seepage during shipping, handling and/or cooking of the food product.

The present invention also concerns compositions that are in a liquid form when added to a food product, and form a gel in the uncooked food product.

The present invention also concerns compositions that have changing viscosities, including lower viscosities, at least during a time period when the compositions are to be added to food products, and obtain a higher viscosity in the uncooked food product.

The present invention also concerns thixotropic gel compositions that can be agitated to form liquid compositions, with the liquid compositions being added to food products for subsequent re-gelling in the food products.

The present invention also concerns the maintaining of food products, especially meats, from wild or domesticated animals or seafood in general, with or without bones and skin, and, for example, breast meat of turkey and chicken, and dry types of fish, such as tuna and swordfish, tender and juicy upon cooking, even with low levels of food treating composition incorporated therein.

The present invention is directed to a process for forming a food treating composition, comprising mixing water and a gellable polysaccharide under conditions so that the gellable polysaccharide is at least one of dissolved or hydrated, and mixing the at least one of dissolved or hydrated gellable polysaccharide with at least one gelling cation in an amount effective to form a thixotropic gel.

The present invention is also directed to a process for treating a food product comprising adding to the food product an aqueous composition which is gellable in the food product.

The composition can comprise a thixotropic gel which has been shear thinned, and is added to the food product in a shear thinned condition.

The thixotropic gel composition can be formed by mixing water and a gellable polysaccharide under conditions so that the gellable polysaccharide is at least one of dissolved or hydrated, and mixing the at least one of dissolved or hydrated gellable polysaccharide with at least one gelling cation in an amount effective to form a thixotropic gel.

The water can comprise at least one of tap water, distilled water, demineralized water, and de-ionized water.

The gelling cation can comprise at least one salt, such as at least one of sodium chloride, potassium chloride, calcium chloride, sodium phosphate, potassium phosphate, salts of citric acid, salts of carbonic acid, and salts of tartaric acid, preferably sodium chloride.

The gellable polysaccharide can comprise at least one of carrageenans, carrageenans in combination with at least one of locust bean gum, cassia gum or konjac gum; xanthan gum; xanthan gum in combination with seed gums; meal or flour of seaweeds containing gelling polysaccharides, either untreated or treated; fruit or vegetable powder containing gelling polysaccharides; gelling pectin; gellan gum; alginates; and gelling starch. The gellable polysaccharide can comprise fruit or vegetable powder containing gelling polysaccharides comprising at least one of citrus peel powder, apple peel powder or the part of sugar beet, which remains after extraction of sugar. The gellable polysaccharide can comprise low ester pectin, as well as low ester pectin in combination with carrageenan. The meal or flour of seaweeds containing gelling polysaccharides can comprise meal or flour of seaweed treated with alkali. The meal or flour of seaweeds containing gelling polysaccharides can comprise meal or flour of seaweed selected from the group consisting of *Eucheuma Spinosum, Eucheuma Cottonii, Chondrus Crispus*, Gigartina species, and Hypnea species.

The gellable polysaccharide can comprise at least one of iota carrageenan, kappa carrageenan, lambda carrageenan, xanthan gum and low ester pectins, and mixtures of these gellable polysaccharides with seed gums. The gellable polysaccharide can comprise a sodium carrageenan.

The water with which the gellable polysaccharide is mixed can have a salt concentration of less than about 2 wt %, more preferably less than about 1 wt %, even more preferably less than about 0.75 wt %, and even more preferably less than about 0.5 wt %.

The thixotropic gel, when thinned sheared, preferably has a viscosity of up to about 100,000 cps, with preferred ranges of greater than the viscosity of distilled water to about 100,000 cps, more preferably about 3 to 50,000 cps, even more preferably about 5 to 30,000 cps, and even more preferably about 10 to 20,000 cps. The thixotropic gel, when shear thinned, preferably has a viscosity of less than about 2,000 cps, more preferably less than about 1,500 cps, even more preferably less than about 1,000 cps, with preferred ranges including greater than the viscosity of distilled water to about 1,000 cps, about 3 to 900 cps, about 5 to 800 cps, about 10 to 800 cps. and about 20 to 800.

The gelling polysaccharide can be granulated or agglomerated. After formation of the thixotropic gel, additional polysaccharide can added. The gellable polysaccharide can comprise at least one carrageenan, and the at least one carrageenan can be present in the thixotropic composition in a concentration up to about 10 wt %, more preferably up to about 5 wt %, with preferred ranges including about 0.01 to 2 wt %, and about 0.1 to 1 wt %.

At least one food additive can be included in the processes and compositions of the present invention.

The food product can comprise at least one of meat, seafood and poultry.

Moreover, the aqueous composition can comprise a composition that does not form a gel externally of the food product, and which composition is gellable in the food product. At least one of temperature and gelling cation concentration of the gel externally of the food product can be insufficient to initiate gelling of the aqueous composition. The naturally occurring salts in the food product can effect gelling of the aqueous composition when the aqueous composition is mixed with the food product. The concentration of gelling cation in the aqueous composition externally of the food product can be below a gelling effective amount, and conditions of the aqueous composition wherein the food products can be changed to raise the concentration of gelling cation to at least a gelling effective amount. The gelling ion concentration can be increased by freezing or heating the food product. The gelling cation can be added to the food product. Encapsulated gelling cation can be added to at least one of the aqueous composition and the food product. The encapsulated gelling cation can be added to the aqueous composition, and the encapsulated gelling cation can be subjected to conditions to release the gelling cation after mixing the aqueous composition with the food product. The gelling cation can be present in the aqueous composition in an insoluble condition, and can be rendered soluble after mixing the aqueous with the food product.

The present invention is also directed to food products produced with the processes and compositions of the present invention, such as meat, seafood and poultry food products.

BRIEF DESCRIPTION OF THE DRAWINGS

The above and other features and advantages of the present invention will be made apparent from the following description of the preferred embodiments, given as non-limiting examples, with reference to the accompanying drawings, in which:

FIG. 2 shows the relation between salt concentration (in solution before addition of carrageenan) and carrageenan concentration, which is practically in solution and is gelled by adding additional 2% NaCl and thereafter shear thinned, at a constant viscosity.

FIG. 3 shows thixotrophy illustration of food treatment composition.

DETAILED DESCRIPTION OF THE PRESENT INVENTION

Figure 1:
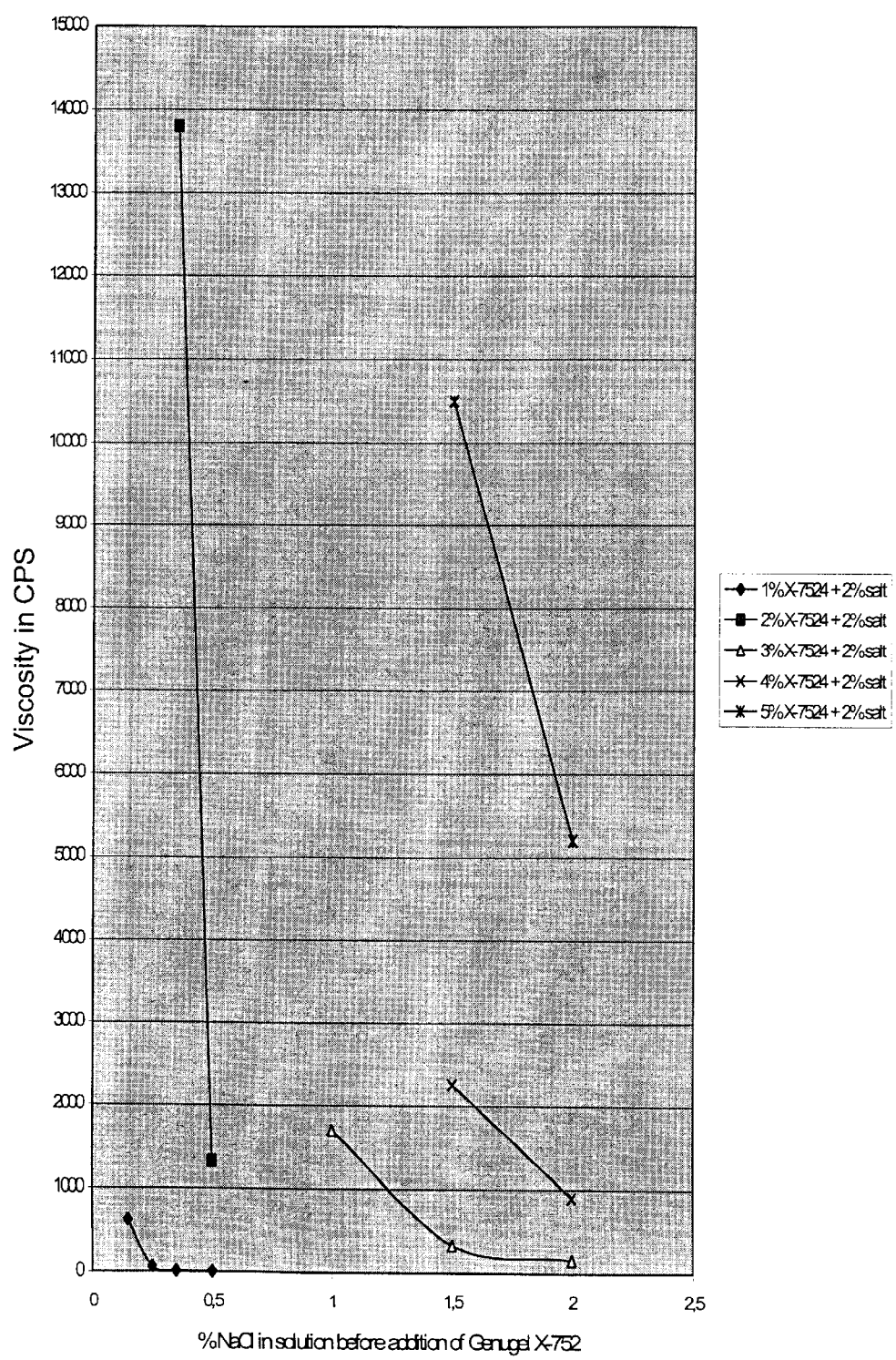
FIG. 1 shows a plot of viscosity vs. NaCl concentrations.

The particulars shown herein are by way of example and for purposes of illustrative discussion of embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description making apparent to those skilled in the art how varying forms of the present invention may be embodied in practice.

Unless otherwise stated, all percentages, parts, ratios, etc., are by weight.

Unless otherwise stated, a reference to a compound or component includes the compound or component by itself, as well as in combination with other compounds or components, such as mixtures of compounds.

Further, when an amount, concentration, or other value or parameter, is given as a list of upper preferable values and lower preferable values, this is to be understood as specifically disclosing all ranges formed from any pair of an upper preferred value and a lower preferred value, regardless whether ranges are separately disclosed.

The present invention is directed to food treating compositions that gel in a food product prior to cooking of the food product. Thus, the food treating compositions of the present invention are capable of being added to a food product, and forming a gel in the uncooked food product. The formation of a gel in the uncooked food product provides many advantages to food products according to the present invention, and enables the formation of food products that have many advantages. In particular, the uncooked food product according to the present invention can be prepared with the food treating composition of the present invention at one location and shipped to another location, without excessive liquid seepage, for further processing. Moreover, the food treating composition of the present invention permits the food to be frozen for subsequent thawing without excessive liquid loss when thawing. Still further, the food treating composition according to the present invention permits the cooking of food without excessive weight loss during cooking.

In order to provide a fuller understanding of the present invention and the terms associated therewith, the following definitions are provided.

By "uncooked food product" is meant a food product, which has not received a heat treatment, or has received a heat treatment at one or more temperatures below the temperature, which renders the proteins in food denatured. This temperature is typically below about 60° C., but varies according to the protein composition of the food. For meat and poultry, the heat treatment would comprise one or more temperatures of preferably less than about 60° C., and even more preferably less than about 55° C. For fish, the heat treatment would comprise one or more temperatures of preferably less than about 50° C., and even more preferably less than about 40° C. Thus, uncooked food product includes food product that is uncooked, such as food product that has not being subjected to any treatment temperature, such as chilled or frozen food product, as well as food that has been heated, but not heated sufficiently to arrive at a protein denaturing temperature, such as semi-warm smoking.

The present invention provides a food treating composition that gels in the uncooked food product. Preferably, the food treating composition is capable of gelling at temperatures below about 70° C., and even more preferably below about 55° C., and even more preferably below about 30° C. Preferably, the food treating composition according to the present invention is added at temperatures at which food products are normally processed, handled, shipped and/or stored, and preferably maintains its gelled condition during all of this processing, handling, shipping and storage. In this manner, the gelled food treating composition of the present invention will maintain seepage of liquid from food products to, at most, minimal levels during all stages of food handling.

It is noted that during cooking the gel will melt at a certain temperature and form some viscosity, and thereby partially reduce cooking loss. Thus, liquid seepage from the food product will be reduced during cooking as well as during distributing and handling. However, liquid seepage during cooking can be further reduced by including additional undissolved, unswelled, unhydrated polysaccharide, such as carrageenan, into the composition.

Exemplary preferred embodiments of the present invention will be described herein with respect to the inventive concept of providing a food treating composition that gels in the uncooked food product.

In one aspect, the present invention is directed to food treating compositions comprising a thixotropic (shear thinning) gel that can be added to the food product. In this aspect of the present invention, the thixotropic gel can be subjected to agitation prior to adding to the food product to thereby reduce the viscosity of the gel. The shear thinned composition can then be added to the food product during the time that it is of a sufficiently low viscosity so that it can be added to the food product, such as, but not limited to, using injection equipment, mixing, blending, and tumbling equipment. Once the shear thinned composition is in the food product, it will re-gel to thereby provide the advantageous minimal seepage of liquids from the food product in accordance with the present invention.

The thixotropic gel food treating composition can be prepared in any manner that enables the formation of a gel that is shear thinning, is capable of re-gelling in a food product, and is capable of maintaining itself as a gel during food storage and distribution, and to a limited degree during food preparation. Therefore, the following description of thixotropic gel preparation is non-limiting.

In the preparation of the thixotropic gel, a gelling polysaccharide (also referred herein for ease of reference as polysaccharide) and water are mixed together to form an initial polysaccharide containing composition. The polysaccharide can comprise various polysaccharides that can form a thixotropic gel, such as, but not limited to, at least one of carrageenans, such as kappa, lambda, and iota carrageenan, either alone or in combination with one or more of locust bean gum, cassia gum or konjac gum; xanthan gum; xanthan gum in mixture with seed gums such as locust bean gum, guar gum, konjac gum and/or cassia gum; meal or flour of seaweeds containing gelling polysaccharides, such as red and brown seaweeds, either untreated or treated with for instance alkali; fruit or vegetable powder containing gelling polysaccharides, such as citrus peel powder, apple peel powder or the part of sugar beet, which remains after extraction of sugar; gelling pectin such as low ester pectin; gellan gum; alginates; gelling starch.

Preferably, the polysaccharide comprises one or more of the following:

Iota carrageenan, kappa carrageenan, xanthan gum and low ester pectins, and mixtures of these with seed gums.

Polysaccharides are water-soluble or strongly swellable substances, so-called hydrocolloids, which in aqueous systems give colloidal, more or less highly viscous solutions or dispersions having plastic or pseudo-plastic flow. From this are derived the functional properties desired in the present case, such as a thickening action, water-binding capacity, stabilization of suspensions and emulsions in polyphase systems, and gel formation.

Bayerlein, et al., U.S. Pat. No. 4,826,700, which is incorporated by reference herein in its entirety, describe carrageenans and agar as extracts of red algae and belong chemically to the group of the galactans. However, unlike cellulose and starch, they do not exhibit merely one type of 1,4-glycoside bond. The red algae galactomannans instead have alternate α-1,3-bonds and β-1,4-bonds, and are therefore characterized as an a-b-a type of polysaccharide. Carrageenan is chemically not a homogeneous product but comprises the product group of sulfated galactans, with a proportion of the galactopyranose residues being present as a 3,6-anhydrogalactose residue. Certain fractions of carrageenans can be isolated from red algae extracts which are chemically defined with respect to their structure and are designated by Greek letters. Only lambda-, iota- and kappa-carrageenan are of commercial importance. Their different properties are principally explicable in terms of differences in the content of anhydrogalactose and sulfate ester groups. The 3,6-anhydrogalactose ring makes the galactans more strongly hydrophobic, i.e., the water solubility diminishes.

On the other hand, the sulfate group imparts more hydrophilic properties to the galactans, i.e., the water solubility increases. Moreover, the presence of the sulfate groups has the consequence that the properties of carrageenan as an anionic polysaccharide can be modified by the presence of cations in the aqueous system. Thus, the gelling properties of kappa-carrageenan are greatly influenced by potassium ions and those of iota-carrageenan by calcium ions.

On the other hand, in agar, an electrically neutral galactan having a high anhydrogalactose content, gelling takes place independently of cations. Kappa-carrageenan has the highest anhydrogalactose content and the lowest sulfate content among the carrageenans, and as a result has the most powerful gel-forming properties. As already mentioned, it has a high dependence on the potassium ion concentration.

Lambda-carrageenan, on the other hand, does not contain any anhydrogalactose and has the highest sulfate ester content among the carrageenans. This has the consequence that it can no longer be caused to gel.

Carrageenan can be produced by different methods, such as by dissolving the carrageenan in hot alkali before purifying it, and leaving the carrageenan undissolved while impurities are extracted. The latter process is far less energy intensive. For example, carrageenan can be extracted from many species of red seaweeds, some examples being *Eucheuma Spinosum, Eucheuma Cottonii, Chondrus Crispus*, Gigartina species, and Hypnea species. The process begins with harvesting, followed by drying, cleaning, bagging or bailing for shipment to warehouses. The seaweeds are washed to remove dirt and marine organisms and then extracted in hot alkaline. When the carrageenan is dissolved, it can be clarified through conventional filtration and then concentrated by membrane ultrafiltration, or other suitable processes. The carrageenan can be precipitated by alcohol or potassium chloride to separate it from soluble impurities. This is followed by drying and grinding to appropriate particle size.

When the carrageenan is not dissolved, i.e., when the carrageenan is not separated from the seaweed, no clarification is carried out and no precipitation steps are necessary. This therefore leads to energy saving and cost reduction.

Galactomannans are, like the starches, vegetable reserve polysaccharides which occur in the endosperm cells of numerous seeds of Leguminosae. Upon germination of the seeds, they undergo enzymatic degradation and serve as nutrients for the seedling. The collective term "galactomannan" or "polygalactomannan" comprises all polysaccharides which are built up of galactose and/or mannose residues and in addition can also contain minor amounts of other sugar residues. There is a relatively large number of galactomannans, depending on their origin. The materials principally occur in the endosperm portions and seeds of various Leguminosae (legumes) such as guar, locust bean, tara, honey bean, flame tree, sesbania and species of Cassia. Galactomannans are built up of a linear mannose chain which itself is built up of mannopyranose rings linked by β-(1,4-glucoside bonds. To these rings are attached, as branches, isolated galactopyranose residues by α-(1,6-glucoside bonds.

Among the numerous known galactomannans, three in particular have been isolated and used:

1. Locust bean gum (carubin) has long been known. It is obtained from the seeds of the locust bean tree (Ceratonia siliqua L.), which is a native of Mediterranean countries.

2. Guar gum (Guaran) is today the most important galactomannan. It is isolated from the seeds of the guar bean Cyamopsis tetragonolobus L. taub.) which is a native of India and Pakistan.

3. Tara gum has only in recent times been produced in small amounts from the seeds of the tara tree (Cesalipinia spinosa), which grows particularly in Peru.

Xanthan is a high-molecular-weight polysaccharide which is obtained in a fermentation process employing a microorganism Xanthomonas campestris. The main chain of xanthan has a cellulose structure. It consists of D-glucose units with β-1,4-bonds. The trisaccharide side-chains consist of two mannose units and one glucuronic acid unit. The terminal β-D-mannose unit is linked by a glycoside bond to the 4-position of the β-D-glucuronic acid, which in turn is linked by a glycoside bond to the 2-position of α-D-mannose. This side-chain is linked to the 3-position of every second glucose residue of the polymer main chain. Roughly half the terminal D-mannose residues bear a pyruvic acid radical which is linked by a ketal bond to the 4- and 6-positions of the mannose ring. The non-terminal D-mannose unit of the side chain carries an acetyl group in the 6-position. The glucuronic acid group is present as a mixed potassium, sodium and calcium salt.

According to Sugiyama, et al., U.S. Pat. No. 3,973,008, which is incorporated by reference herein in its entirety, konjac (Amorphophalus Konjac C. Koch) is a perennial plant belonging to the family Araceae. "Konnyaku", which is made from the tuber of this plant, has been used traditionally for food in Japan for several hundred years. The predominant component of edible konnyaku is a glucomannan called konjac mannan. Edible konnyaku is made from the konjac flour, which is obtained from the dried tuber of this plant.

According to Williams, et al., U.S. Pat. No. 4,268,533, which is incorporated by reference herein in its entirety, pectin is a gellable substance, derived from fruits and vegetables which structurally is partially methoxylated polygalacturonans built up from D-galacturonic acid units forming long chain-like molecules. The pectin is available in two forms, each of which gels by a different mechanism, that is a high methoxyl (HM) type having a degree of methoxylation (DM), or ratio of methoxylated galacturonic acid groups to total acid groups of 50% or above, and a low methoxyl (LM) type having a DM of less than 50%. One method of producing an LM pectin involves reacting methoxyl groups with ammonia to form amide groups. The resulting pectin usually contains from about 2.5 to 4.5% methoxyl groups by weight as compared to the HM pectin which generally contains from 8–14% methoxyl groups by weight. HM pectin requires a sugar or soluble solid content of approximately 55% by weight or higher and a pH of about 3.0–3.2 to achieve set. When the methoxyl ester content of LM pectin goes below about 7%, the pectin loses its ability to form sugar-acid gels as in the HM pectin, but acquires the ability to form gels through crosslinking of the carboxyl groups on neighboring adjacent pectin molecules or chains in the presence of polyvalent calcium ions.

Morris, et al., U.S. Pat. No. 5,869,118, which is incorporated by reference herein in its entirety, describe gellan gum as a high molecular weight extracellular heteropolysaccharide produced by fermentation of a culture of Pseudomonas elodea, ATCC 31461. During fermentation, oxygen, temperature and pH are strictly controlled. When the fermentation is complete, the gellan gum is isolated from the broth by alcohol extraction and dried. It is known that gellan gums form gels with a wide variety of cations, notably calcium (Carrageenan 2+), magnesium (Mg 2+), sodium (Na+), potassium (K+) and also hydrogen ions (H+) from acid. These cations cause the gellan molecules to associate and form a gel. Calcium and magnesium are known to be much more efficient gel formers than sodium or potassium.

According to Kershaw, et al., U.S. Pat. No. 5,986,164, which is incorporated by reference herein in its entirety, alginates are produced by a variety of micro-organisms and marine algae which are the normal commercial source. The alginates being natural materials show considerable variety but are characterized in being block copolymers, the individual monosaccharide units being arranged into groups as blocks of mannuronic (M) and guluronic (G) residues. In addition to the repeating blocks each polymer chain can contain a proportion of alternating M and G monosaccharide units.

According to Wesdorp, et al., U.S. Pat. No. 5,279,844, which is incorporated by reference herein in its entirety, gelling starches may be derived from any starch source, including corn, potato, tapioca, sweet potato, wheat rice, sago, waxy maize, high amylose corn, sorghum, and the like. These may be converted to fluidity or thin-boiling starches prepared by oxidation, alpha-amylase (enzyme) conversion, mild acid hydrolysis or heat dextrinization. Other gelling starches include pregelatized, precooked, cold water swelling starches, and derivatized starches such as ethers and esters and other modified starches. Methods for preparing modified food starches are well known in the art.

Examples of carrageenans according to the present invention include GENUGEL® carrageenan type CJ, GENUGEL® carrageenan type X-7524 which is similar to GENUGEL® Carrageenan type CJ, but is agglomerated, GENUVISCO® carrageenan type J, GENUGEL® carrageenan type C-59, GENUGEL® carrageenan type C-160, GENUGEL® carrageenan type C-151 and GENUGEL® carrageenan type C-209. These carrageenans are manufactured by Hercules Copenhagen A/S, Ved Banen 16, DK-4623 Lille Skensved, Denmark.

An especially preferred hydrocolloid is GENUGEL® carrageenan type X-7524 which reduces the normally high liquid seepage during distribution in un-cooked condition of injected meat, poultry and seafood products, and also the normally high thawing loss associated with injected and frozen poultry, fish and meat products, and also reduces the normally high cooking-loss associated with injected meat, poultry and fish products.

The polysaccharide is preferably in agglomerated or granulated form, or prepared in any other manner so as to facilitate dissolution, hydration and dispersion of the polysaccharide. Moreover, glycerol and/or oils or other materials that facilitate dispersion, hydration and/or dissolution can be used.

Moreover, when referring to the polysaccharide, it is noted that the discussion is with respect to active polysaccharide ingredient. In other words, the polysaccharide can be a portion of a polysaccharide containing material. Thus, for example, when referring to a concentration of polysaccharide, this means that the polysaccharide portion of the polysaccharide containing material is present at that concentration. Thus, for example, red seaweed contains a percentage of carrageenan, and in referring to the concentration of carrageenan, reference is being made to the percentage of carrageenan in the seaweed, and not the total amount of seaweed. Also, for example, the gelling polysaccharide may constitute a portion of fruit or vegetable powder.

Expanding upon the above, it is noted that the polysaccharide can be in any form that enables gelling. For example, the polysaccharide can be in its natural state, such as, for example, carrageenan or alginate in seaweed, it can be separated from its natural state, such as by extraction, and it can be modified in situ, or during or after separation. Still further, the polysaccharide can be produced by any synthetic technique, or can be produced by biotechnical procedures.

Still further, it is noted that polysaccharides, such as carrageenans, primarily require two conditions for gelling. In particular, the temperature must be below a gelling temperature, such as 50° C. to 70° C., and about 20° C. for cold gellable polysaccharides. Moreover, cations that can cause gelling of the polysaccharide, such as potassium, calcium, barium and magnesium cations, need to be present, and sodium when present in high concentrations, such as, but not limited to, sodium chloride of greater than about 0.1 wt %. Thus, for example, if the polysaccharide is in a sodium form, as compared to a potassium or a calcium form, then one of the conditions for gelling is not present. For example, in the absence of sodium ions in high concentrations, GENUGEL® carrageenan type CJ or GENUGEL® carrageenan type X-7524 cannot form a gel in the absence of gelling cations, such as potassium and/or calcium, because it is a sodium iota carrageenan. In contrast, even in the absence of sodium ions in high concentrations, GENUVISO® carrageenan type J can form a gel in the absence of additional gelling cations, because it is a calcium iota carrageenan, and therefore has calcium present to enable gelling at an appropriate gelling temperature.

The mixing of the polysaccharide with water is preferably performed under agitation that is adequate to ensure that the polysaccharide is dissolved in the water. For example, agitation can be achieved by using industrial brine preparation equipment, a bowl chopper, a high speed mixer, high speed stirring device, an emulsifier or a colloid-mill.

The water can be any source of water, including but not limited to, distilled water, demineralized water, tap water, and ion-exchanged water. The water can contain no salt or substantially no salt therein prior to the addition of the polysaccharide. However, the water can include amounts of salts therein, such as up to about 2 wt %, more preferably up to about 1 wt %, still more preferably up to about 0.75 wt % of salts, and even more preferably up to about 0.5 wt %, such as, but not limited to, sodium chloride, potassium chloride, calcium chloride, sodium phosphate or potassium phosphate.

It is noted that salt decreases the solubility of polysaccharides. Therefore, the higher the concentration of salt in the water when the polysaccharide is added thereto, the higher the concentration of polysaccharide that can be added without causing excessive viscosity in the shear thinned gel. Thus, salts will partially suppress the solubility of the polysaccharide, such as carrageenan, and thereby permit higher concentrations of polysaccharide, such as carrageenan, to be added while still keeping viscosity within the limitations of desired viscosity, such as a viscosity needed to use a multineedle injector. A benefit of having higher concentrations of polysaccharide in the food treating composition is that higher concentrations of polysaccharide are good for even further reducing water loss during shipping and storage, as well as cooking-loss reduction and for providing good texture of the food product after cooking.

The salt concentration of the water can be changed prior to the addition of the polysaccharide. For example, if the concentration of salt is lower than desired for the addition of the polysaccharide, then salt can be added to the water to provide the desired concentration. Conversely, if the concentration of natural salts is higher than desired, such as when the water is too hard, then calcium and magnesium ions can be sequestered using a sequestrant, such as, but not limited to, polyphosphates, such as sodium polyphosphate and hexametaphosphate, pyrophosphates, such as sodium pyrophosphate, or organic acids, such as ethylenediaminetetraacetic acid (EDTA).

It is noted that the solubility of the salt affects the ability of the salt to influence the solubility of the polysaccharide. Thus, lower solubility salts would have less effect on the polysaccharide, and therefore higher concentrations of lower solubility salts can be included in the composition than higher solubility salts. For example, for GENUGEL® carrageenan type CJ or GENUGEL® carrageenan type X-7524, when about 0.15 wt % NaCl is in solution, about 1 wt % of the carrageenan can be used to provide a viscosity of about 600 cps; when about 1 wt % NaCl is in solution, about 2 wt % of the carrageenan can be used; when about 1.5 wt % NaCl is in solution, about 3 wt % of the carrageenan can be used; when about 2 wt % NaCl is in solution, about 4 wt % of the carrageenan can be used. For less soluble carrageenans, the corresponding carrageenan concentration will be higher than for GENUGEL® carrageenan type CJ or GENUGEL® carrageenan type X-7524. As will be discussed below, it is preferred that the composition have a viscosity of less than about 1,000 cps to be useful in typical industrial multineedle injectors.

The order of addition of salt, such as NaCl and the polysaccharide is important, because once the polysaccharide, such as carrageenan, in solution is gelled by salt addition, no other addition of salt or polysaccharide will redissolve the polysaccharide into solution. For example, it is possible to first add some salt to the water to partially suppress the solubility of a first addition of polysaccharide. Then, an initial addition of polysaccharide can be made, such as an amount of polysaccharide the solubility of which is not completely suppressed by the earlier added salt so that at least a portion of the polysaccharide is dissolved. Additional salt can then be added, which additional salt concentration can be the desired total concentration of salt in the composition or a portion thereof. It is noted that even a small addition of salt at this stage will gel the dissolved part of the polysaccharide, so as to gel the composition. At this point, additional polysaccharide can added; however, the additional polysaccharide will not dissolve, or swell if the salt concentration is of a sufficiently high concentration.

The above-described multiple addition is normally not commercially practical, and therefore other methods of being able to work with higher concentrations of polysaccharides in the composition, without having too high a viscosity, are desirable. In this regard, one manner of achieving higher concentrations of polysaccharide in the food product includes dissolving some amount of salt which will partially suppress the solubility of the polysaccharide, and then dissolving, hydrating, or swelling the polysaccharide, and thereafter adding the remainder of the salts, so that the brine gels. Alternatively, another more practical manner of achieving higher polysaccharide concentrations, is to first dissolve the amount of polysaccharide that gives the needed viscosity after gelation, then add all the salts, and gel the solution. After gelling, additional polysaccharide can be added in practically any useful amount.

It is noted that the lower the temperature of the water, the higher the concentration of polysaccharide that is needed for a given viscosity. Polysaccharides are generally more soluble at higher temperatures than at lower temperatures. Thus, if the water temperature is low, for instance around 5° C., more polysaccharide must be added in order to achieve enough polysaccharide in solution to create gelation, than would be the case at around ambient temperature. At about 0° C., about twice as much polysaccharide, e.g., GENUGEL® carrageenan type X-7524, is needed as compared to 20° C. Moreover, at about 20° C., about twice as much polysaccharide, e.g., GENUGEL® carrageenan type X-7524, is needed as compared to 50° C. However, high temperatures, such as 50° C., are not as preferred as lower temperatures, such as 20° C., because high temperatures are not as convenient and more costly for being acceptable practice by most food processing companies. With the above in mind, the temperature of the water to which the polysaccharide is added is preferably within a preferred range of from about −5° C. to 100° C. More preferably, the temperature of the water ranges from about −5° C. to 70° C., even more preferably about −5° C. to 55° C., even more preferably about 0° C. to 30° C., and even more preferably about 5° C. to 30° C. Moreover, a temperature of about 20° C. is a particularly preferred temperature of the water when adding the polysaccharide.

Expanding upon the above, it is noted that the polysaccharide can be present in the solution in both dissolved/ hydrated (or swelled) form, and in an undissolved (non-hydrated, non-swelled) form. The dissolved (hydrated, swelled) form of the polysaccharide primarily contributes to the viscosity of the shear thinned food treating composition. As indicated above, there are various manners of achieving greater solubility of the polysaccharide. Moreover, as noted above, the salt concentration in the water and the temperature of the water affect how much polysaccharide can be dissolved in the water. As discussed, higher salt concentrations, lower the solubility of the polysaccharide. Moreover, lower temperatures decrease the solubility of the polysaccharide. Thus, when utilizing a specific polysaccharide in the thixotropic gel food treating composition, the parameters to be considered are the temperature of the water, the salt concentration in the water, the concentration of the polysaccharide, the solubility of the polysaccharide and the order of addition of the components. By varying any one or more of these parameters, the amount of polysaccharide dissolved in the water can be controlled to provide a thixotropic gel food treating composition that has a desirable viscosity when shear thinned.

Thus, other less soluble polysaccharides can be used in higher concentrations for obtaining the same viscosity, at a same temperature. For example, with respect to the above, GENUGEL® carrageenan type CJ or GENUGEL® carrageenan type X-7524 is more soluble than GENUVISCO® carrageenan type J, obtained from Hercules Copenhagen A/S, Ved Banen 16, DK-4623 Lille Skensved, Denmark. In particular, GENUVISCO® carrageenan type J is a less soluble carrageenan type that hydrates or swells at about 40° C. to 60° C., whereas GENUGEL® carrageenan type CJ or GENUGEL® carrageenan type X-7524 hydrates or swell at about 5° C. to 25° C. Moreover, it is noted that iota carrageenan is more soluble than kappa carrageenan.

Expanding upon the above, increasing the yield of polysaccharide dissolved, such as, GENUGEL® carrageenan type CJ or GENUGEL® carrageenan type X-7524, can be achieved by using higher dissolution temperature, and thereby permitting lowering of the carrageenan concentration. For example, a 50% reduction of carrageenan concentration would be possible if dissolution temperature is 40° C.; a 75% reduction of carrageenan concentration would be possible if dissolution temperature is 60° C. to 70° C.

After the polysaccharide is dissolved in the water, either with or without salt being present, salt that is capable of forming a thixotropic gel is added to the composition in at least an amount effective to initiate gelling. The salt should be present in at least an amount effective to effect gelling, with higher concentrations of salts being limited by taste and cost considerations. Such salts to effect gelling include, but are not limited to sodium chloride, potassium chloride, calcium chloride, sodium phosphate, potassium phosphate, salts of citric acid, salts of tartaric acid. For example, an effective amount of sodium chloride would preferably be present at a concentration of at least about 0.1 wt %, more preferably of at least about 0.5 wt %, with upper limits of the sodium chloride being controlled amongst other parameters by taste and cost considerations.

It is noted that, before gelling can occur, the polysaccharide must first be at least partially in solution before the addition of the salt causing gelation.

The object of the formation of the thixotropic gel food treating composition is to enable the gel, after thin shearing, to be capable of being added to food products to promote the retention of moisture in the food products during handling, storage, shipping and/or cooking. Therefore, the sheared thinned food treating composition should be capable of being added to the food product in any manner that enables the shear thinned food treating composition to diffuse through the food product, or at least diffuse through the food product to a sufficient extent to provide sufficient reduction of water loss, e.g., syneresis or purge. Thus, depending upon the technique for addition of the shear thinned food treating composition to the food product, the shear thinned food treating composition can have different viscosities. In this regard, in instances wherein the viscosity of the shear thinned food treating composition can be higher, then higher concentrations of the polysaccharide (i.e., higher concentrations of polysaccharide can be in solution in the food treating composition, and gelled to thereby provide higher viscosity) can be included in the food treating composition. In this regard, it is noted that undissolved, non-hydrated/non-swelled polysaccharide will not significantly affect the viscosity of the food treating composition.

Expanding upon the above, in instances wherein injection equipment is utilized to add the shear thinned food treating composition to the food product, the viscosity of the composition is preferably within a viscosity so that conventional injection equipment, such as a Fomaco Multineedle Injector Equipment model FGM 20/40, can be utilized to inject the composition. For example, it is preferred that the shear thinned food treating composition have a viscosity that is less than about 2,000 cps, more preferably less than about 1,500 cps, and even more preferably less than about 1,000 cps. Moreover, it is preferred that the viscosity of the shear thinned food treating composition be greater than the viscosity of distilled water, more preferably greater than about 3 cps, even more preferably greater than about 5 cps, even more preferably greater than about 10 cps, even more preferably greater than about 20 cps, with preferred ranges including greater than the viscosity of distilled water to about 1,000 cps, about 3 to 900 cps, about 5 to 800 cps, about 10 to 800 cps. and about 20 to 800.

Viscosity of the shear thinned food treating composition is measured in accordance with the present invention using a Brookfield LVT viscosity meter, as discussed in the Examples herein. In particular, UL adaptor or spindles 1 to 4 and the rpm are chosen according to the viscosity to be measured, at 20° C. after a 60 second run time, and the viscosity measurement is started at 1 minute after stopping agitation to achieve the shear thinned composition using agitation as in the viscosity measurement example set forth in the Examples. For purposes of uniformity, the viscosity measurement is preferably made of the composition containing water, salt and gelling polysaccharide in the absence of additional components.

Still further, a preferred viscosity range for the shear thinned food treating composition for use with a conventional injection equipment, such as a Fomaco Multineedle Injector Equipment model FGM 20/40, according to the present invention is up to about 1,000 cps, and more preferably up to about 900 cps, and even more preferably up to about 800 cps, with the viscosity being greater than the viscosity of distilled water, more preferably at least about 3, even more preferably at least about 5, seven more preferably at least about 10, and even more preferably at least about 20.

Still further, in instances where the food treating composition is to be mixed with the food, such as in high shear equipment, the viscosity of the shear thinned food treating composition can be higher. Thus, in instances wherein the incorporation of the shear thinned food treating composition into the food product will take place in a grinder, cutter or emulsifiers, e.g. colloid mills, then higher concentrations of polysaccharides can be utilized to provide higher viscosity compositions. For example, when making sausage products, for example any type of sausage or grill sausage to be distributed in un-cooked condition, and English breakfast sausage, or, for example, when making a ham paste using cooked ham as one ingredient and shear thinned food treating composition as another ingredient, prepared depending on product type in a mixer, blender, grinder, cutter, emulsifiers or colloid mill. Viscosities that can be handled in these instances can be the same as for the injection of the food treating composition; however, the viscosities can be as high as 100,000 cps, with ranges including greater than the viscosity of distilled water to about 100,000 cps, as well as 1,000 to 50,000 cps, and 1,500 to 30,000 cps, and 2,000 to 20,000 cps.

As discussed above, the concentration of polysaccharide included in the food treating composition can be varied depending upon the manner of addition to the food product, and can also be varied depending upon the specific polysaccharide utilized in the composition. For example, with respect to the use of carrageenan, such as GENUGEL® carrageenan type CJ or GENUGEL® carrageenan type X-7524, the carrageenan can be included in the composition at a concentration up to about 10 wt % or greater, more preferably up to about 5 wt %, in instances where the shear thinned food treating composition is to be added to the food product by, for example, mixing, cutting, emulsifying. If the shear thinned food treating composition is to be added using injection equipment, then it is preferred that the carrageenan be included in the composition at a concentration that permits the use of injection equipment, such as up to about 5 wt %, more preferably about 0.01 to 2 wt %, more preferably about 0.1 to 1 wt %, with specifically preferred concentrations being about 1 wt %, 0.75 wt % and 0.5 wt % when using GENUGEL® carrageenan type CJ and/or GENUGEL® carrageenan type X-7524.

As with the initial inclusion of polysaccharide in the water, the polysaccharide can be added at one or more times after the initiation of the gelling. Thus, after gelling takes place, extra polysaccharide can be added, such as in one or more additions, but preferably in one addition as there is no practicable reason to perform several additions after gelling has taken place because after gelling takes place additional polysaccharide will, in principle, remain undissolved/non-hydrated/non-swelled until at cooking.

As discussed above, salt lowers the solubility of polysaccharides. Therefore, before addition of a higher concentration of salt to achieve gelling, polysaccharide can be added which is dissolved to obtain increased viscosity. In contrast, polysaccharide can be added after gelling salt addition. This polysaccharide does not dissolve because salt is also present. It is preferred to add up to about 20 wt %, more preferably up to about 10 wt %, and even more preferably up to about 5 wt % of additional polysaccharide after the composition is gelled. Thus, any amount extra of carrageenan can be added.

The temperature of the composition to which the salt is added to form the thixotropic gel food treating composition can have the same temperatures as the water to which the polysaccharide is added. Thus, the temperature of the water to which the polysaccharide is added is preferably within a range of from about −5° C. to 100° C. More preferably, the temperature of the water ranges from about −5° C. to 70° C., even more preferably about −5° C. to 55° C., even more preferably about 0C to 30° C., and even more preferably about 5° C. to 30° C. Moreover, a temperature of about 20° C. is a particularly preferred temperature of the water when adding the polysaccharide. It is also preferred to have the temperature of the thixotropic gel food treating composition or the shear thinned food treating composition at a temperature of about 0° C. up to about 55° C., more preferably up to about 40° C., and more preferably up to about 30° C. when added to the food product. For microbiological reasons, most industries would prefer up to about 10° C., and more specifically up to about 5° C., especially when added to the food product.

The various ingredients in any of the compositions can be combined in any manner that adequately mixes the various ingredients. For example, the various ingredients can be combined by utilizing injection, tumbling, stirring, mixing and emulsifying.

Additives can be added, in amounts that do not affect or substantially affect the properties of the food treating composition. Moreover, basically any ingredient at all can be added after the gelling of the food treating composition. For example, one or more of the following can be added to the thixotropic gel food treating composition: inorganic salts, particularly chlorides (sodium chloride), phosphates, nitrates or nitrites, organic compounds such as sugar, amino acids, protein extracts, and/or flavoring agent, natural as well as synthetic, spices (fresh, dried, extracted, etc. ) sauces, wines, spirits, liquors, and any other flavor contributing and/or enhancing component and tenderizing agents will comprise one or more inorganic salts, particularly chlorides (sodium chloride), phosphates, nitrates or nitrites, organic compounds such as sugar, amino acids, protein extracts, and/or flavoring agent, natural as well as synthetic, spices (fresh, dried, extracted, etc.) sauces, wines, spirits, liquors, and any other flavor contributing and/or enhancing component and tenderizing agents, for example, enzymes such as papain, bromealin and other proteases, or foods, ingredients or compounds containing these enzymes, any type of animal or vegetable proteins in their natural or modified form, such as gelatine, collagen, egg proteins, milk proteins, soy proteins, and wheat proteins, any type of starches native or modified, alcohols, such as wine or liquors.

Shear thinning of the thixotropic gel food treating composition can be accomplished utilizing various techniques to agitate the thixotropic gel food treating composition. Thus, any technique can be utilized to apply agitation to the thixotropic gel food treating composition to cause a change of the composition from a gel to a liquid having a desired viscosity for a particular situation, so that the shear thinned food treating composition can be added to the food product. For example, the thixotropic gel food treating composition can be shear thinned by a high speed mixer, such as Rotostat type XP01, made by Jorgen Jorgensen Ltd, 65 Prags Bouleward, DK-2300 Copenhagen S, Denmark and Silverson model L4RT, made by Silverson Machines LTD, Waterside, Chesham, Bucks, England, HP5 IPQ.

The shear thinned food treating composition will not reform as long as the shear thinned food treating composition remains under agitation or mechanical stress, such as pumping, stirring and/or injection. After the shear thinned food treating composition is added to the food, such as by injection, the gel starts slowly to reform and gel inside the food product, thereby reducing leakage of the food treating composition. After being added to the food product, such as by injection, the gel will usually partially form within one hour and be mostly gelled within a few hours. The gel will start to reform when no longer subjected to shear stress.

To assist in an understanding of the present invention, the following examples of thixotropic gel food treating compositions for use with injection equipment is defined. Thus, non-limiting examples of thixotropic gel food treating compositions for use with Fomaco Multineedle Injector Equipment model FGM 20/40, with 40 needles include solutions of preferably up to about 1 wt %, more preferably up to about 0.75 wt %, and even more preferably up to about 0.5 wt % GENUGEL® carrageenan type CJ or GENUGEL® carrageenan type X-7524 dissolved in 20° C. tap water, with later addition of the gelling salt. It has been found that a solution of about 0.5 wt % GENUGEL® carrageenan type CJ or GENUGEL® carrageenan type X-7524 has a viscosity of about 500 cps, which is easily handled by the Fomaco injector. Moreover, a solution of 0.75 wt % GENUGEL® carrageenan type CJ or GENUGEL® carrageenan type X-7524 has a viscosity of about 800 cps, which can still be handled by this type of Fomaco injector. It appears that for this type of Fomaco injector an approximate maximum viscosity would be about 1000 cps, whereby the maximum concentration of GENUGEL® carrageenan type CJ in solution should be less than about 1 wt %. Still further, if a carrageenan having a solubility higher than GENUGEL® carrageenan type CJ is used, such as GENUGEL® carrageenan type C-209, lower concentrations of the carrageenan are desirably used, such as 0.75 wt % or lower. Of course, higher concentrations of soluble polysaccharide would be useable with injectors that can handle higher viscosities, and lower concentrations of soluble polysaccharide (in solution and gelled) would be useable with injectors that handle lower viscosities.

In another aspect of the invention, the food treating composition according to the present invention is not gelled during preparation, but is gelled after incorporation into the food product. In other words, the food treating composition is gelled in situ. Thus, in this aspect of the present invention, the food treating composition includes the polysaccharide therein, but does not include components therein that affect gelling of the composition at the time of preparation and/or is not prepared at conditions that enable the composition to gel. For example, the food treating composition can contain components therein that would under certain conditions affect gelling of the food treating composition; however, these components are present under conditions that do not enable them to gel the solution. Thus, the components may be undissolved, such as insoluble at the particular temperature or pH, such as some poorly soluble calcium salts, including calcium sulphate. The components may be in an un-active form during the preparation of the composition, such as present in the composition as an encapsulated active ingredient which will become active only at a particular temperature or pH. Instead, after addition to the food product, conditions will be present in the food product and/or conditions will be modified in the food product to cause gelling of the food treating composition within the food product.

In this aspect of the invention, the food treating composition is prepared in a similar manner to the embodiment of the present invention wherein a thixotropic gel food treating composition is prepared. Thus, as in the thixotropic embodiment, the water can be any source of water, including but not limited to, distilled water, demineralized water, tap water, and ion-exchanged water. The water can contain no salt or substantially no salt therein prior to the addition of the polysaccharide. However, the water can include amounts of salts therein, such as up to about 2 wt %, more preferably up to about 1 wt %, still more preferably up to about 0.75 wt % of salts, and even more preferably up to about 0.5 wt %, such as, but not limited to, sodium chloride, potassium chloride, calcium chloride, sodium phosphate or potassium phosphate. Preferably, the water does not contain salts or substantially does not contain salts, and preferably comprises distilled water, demineralized water and/or ion-exchanged water.

Moreover, it is preferred that the composition be prepared under the same mixing conditions as the thixotropic gel food treating composition. However, basically any temperature can be used in this embodiment, because this embodiment is not as temperature sensitive as the first embodiment. Temperatures will, of course, effect the gelling of the composition, and therefore gelling temperatures are a consideration when preparing the composition if ingredients contained therein can effect gelling of the composition outside the food product. Preferable temperatures include about 0° C. to 100° C., more preferably about 0° C. to 80° C., still more preferably 0° to 60° C., and even more preferably about 0° C. to 40° C., and most preferably about 0° C. to 30° C. Still further, as noted above, different types of polysaccharides, such as carrageenans, will utilize different temperatures for dissolving depending on their particular solubilities.

As noted above, in the in-situ gelling embodiment of the present invention, the water utilized to dissolve the polysaccharide preferably does not have salts therein. Accordingly, the water should be distilled water, demineralized water, or ion-exchanged water. If there are salts and/or ions in the water that may effect gelling, sequestrants, such as those discussed above with respect to the thixotropic gel food treating composition, can be utilized to remove or reduce the concentration of these salts.

Still further, the polysaccharide that is utilized in this in-situ aspect of the present invention is preferably, but not limited to, one or more polysaccharides that do not contain gelling ions, such as potassium or calcium, ions. Thus, preferred polysaccharides include, for example, GENUGEL® carrageenan type CJ or GENUGEL® carrageenan type X-7524. Moreover, preferred polysaccharides for in-situ gelling include carrageenans, especially the sodium salts thereof, and low ester pectins. Preferably, the polysaccharides are soluble below about 40° C., more preferably below about 30° C., and more preferably below about 20° C.

It is once again noted that polysaccharides, such as carrageenans, primarily require two conditions for gelling. In particular, the temperature must be below a gelling temperature, such as 50° C. to 70° C., and about 20° C. for cold gellable polysaccharides. Moreover, gelling cations, such as potassium, calcium, barium and/or magnesium cations, need to be present, as well as sodium when present in high concentrations, such as, but not limited to, sodium chloride of greater than about 0.1 wt %. Accordingly, one manner to prevent gelling until the composition is mixed with the food product is to adjust either the temperature and/or the potassium and/or calcium content and/or sodium content.

The in-situ gelling of the food treating composition can be accomplished in any manner or using any combination of techniques that causes conditions to be present in the food product to cause the internal gelling of the food treating composition, which is also referred to herein as gel-in-place. The following are non-limiting examples of various techniques for in-situ forming of the gelled food treating composition in the food product.

Conditions for effecting gelling of the composition can be present at the time of incorporation of the food treating composition into the food product. These conditions scan occur due to the natural composition of the food product, such as salts naturally present in fresh meat, poultry and fish. For example, the salt concentration of the food product, such as meat, fish and poultry, can be sufficiently high to effect gelling of the food treating composition when the food treating composition is added to the food product.

Gelling conditions can also be caused to occur by changing the salt concentration in food product by various techniques. For example, the concentration of the gelling salt in food product can be increased to cause gelling of the food treating composition by lowering the temperature of the food product, such as by freezing, in cold processed food products, or raising the temperature of the food product, such as to temperatures of about 55° C., 45° C. or 35° C., in semi-warm processed food products, such as meats, and of about 40° C., 30° C. or 25° C. for semi-warm and cold processed fish products. Without being wished to be bound by theory, it is believed that, upon freezing, salts that are naturally in solution in the food product rise in concentration due to freezing out of water and thereby creating gelling conditions, due to the now higher salt concentration in the now unfrozen part of the water. With warming, salts that are naturally in a food product can be bound or insoluble at lower temperatures, but are rendered soluble or liberated when warming of the food product thereby creating gelling conditions.

The food product can be processed with salts prior to the addition of the food treating composition, processed with salts during addition of the food treating composition and/or processed with salts after the addition of the food treating composition, so that gelling conditions are present in the food product when the food treating composition is added thereto, as well as during addition, and after addition, preferably after addition. The salt can be added in various manners, such as, but not limited to, injecting into the food product, mixing with the food product, and soaking the food product in a salt solution.

Encapsulated salts can be added to the food product, with the encapsulated salts being liberated after addition of the food treating composition by, for example, pH adjustment or temperature change. The encapsulated salts can be added before addition of the food treating product, during addition of the food treating composition, and/or subsequent to addition of the food treating composition. Moreover, the encapsulated salts can be added to the food treating composition. Encapsulation can be achieved in any manner, such that disclosed in LaJoie, et al., U.S. Pat. No. 5,874,102, which is incorporated by reference in its entirety, wherein encapsulation of salt can be accomplished through coating with a polymeric material and by coating with fatty acid compositions. Coating polymers are for instance xanthan gum, guar gum, starch, gum arabic, tragacanth gum, dextran, polyvinylpyrrolidone, polyacrylamide, poly(styrene/acrylonitrile), poly(styrene/2-vinylpyridine), poly(ethylene oxide), poly(vinyl acetate), hydroxypropylcellulose, ethylcellulose, cellulose acetate, carboxymethylcellulose, zein, alginate, gelatin, shellac, and the like, such as disclosed in U.S. Pat. Nos. 4,194,013; 4,384,004; 4,877,621; and 4,996,067, which are incorporated by reference in their entireties. The fatty acid ingredient can be a salt derivative of one or more saturated or unsaturated carboxylic acids, such as those derived from beef and mutton tallow, lard, cottonseed oil, palm oil, and the like.

Insoluble salts can be included in the food product, which insoluble salts are made soluble in the food product. For example, the pH of the food product can be adjusted, such as by any food grade acid, glucono delta lactone (GDL), vinegar or wine, and by any food grade alkali, when raising of pH is the activating parameter. Moreover, the temperature of the food product can be changed such as by freezing or warming as discussed above, including a maximum temperature of 55° C. for meat and meat products, and a maximum temperature of about 40° C. for seafood and fish products, or any temperature below a cooking temperature.

Non-limiting examples of food products in which in-situ formation of a gel is beneficial include the following.

In-situ gelling can be used in salami type products for lowering weight loss upon drying and reaching sliceable texture quicker than by conventional methods. Also it is possible to make salami type products without drying (0% weight loss), and still achieve sliceable texture. Also, it is possible to make low fat salami type products with and without drying, and still achieve sliceable texture, such as in uncooked salami type, such as where temperatures do not exceed 55° C.

In-situ gelling can be used in, any type of fresh, chilled, frozen or processed seafood product such as but not limited to smoked fish products, including, for example, cold and semi-warm smoked seafood products, such as, but not limited to, smoked salmon, for reducing process loss during drying and smoking, increasing yield and for giving better sliceability. This goes both for whole filets and parts as well as when smaller pieces or filets (or minced seafood) are incorporated with un-gelled composition, and the composition solution is gelled in-situ thereby creating a coherent, sliceable block of individual filets, pieces, minced and/or comminuted seafood, which can then be, for example, smoked or pickled for later slicing, such as at the location of the producer, distributor, supermarket or the final consumer.

In-situ gelling can also be used in products like cold smoked turkey breast, pork filet or other meat muscle product which will be sold raw and sliced at the deli-counter in the supermarket. By applying this invention in whole meat muscles as well as in smaller pieces of muscles (or minced meat) where the solution is gelled in-situ, the product will become a coherent, sliceable block when using more than one meat piece, and, when using a whole muscle, this muscle will become more firm and sliceable with less drying than normal. Also, these food products can be then cold or semi-warm smoked, such as below about 55° C.

Raw turkey breast, pork filet or other meat muscle product or seafood or whole fish or in parts or filets can be injected with a solution containing high concentration of polysaccharide, for example, such as GENUGEL® carrageenan type CJ or GENUGEL® carrageenan type X-7524, or other carrageenan, or low ester pectins, such as GENU® pectin type L35, in demineralized, ion-exchanged, distilled or very soft water, or hard water that has been softened by the use of sequestrants. Later, that turkey breast, pork filet or other meat muscle product or seafood or whole fish or in parts or filets can be placed in salt brine to be salted over several days or injected with small amount of concentrated salt solution after injecting the low viscosity ungelled polysaccharide solution, such as carrageenan or low ester pectin. Then when the salt comes into contact with the high concentration of polysaccharide in the solution the polysaccharide will gel firmly and the product will become firm and sliceable without any cooking. This product can then be, for example, smoked, and sold whole or sliced. The benefit is very little or no weight loss in drying, which otherwise would be needed in order to get sufficient firmness to slice the product. Moreover, freezing of the food product before slicing to make the slicing easier will in most cases not be necessary. Semi warm smoke process of up to 55° C. may be used. But for seafoods, depending on type, either maximum 30° C. or maximum 40° C. for cold smoked seafood like salmon.

In-situ gelling can also be used in products like any type of grill-sausages distributed in un-cooked condition, the types known locally in each country as well as the traditional type grill-sausage products of Germany, also sausages like the English breakfast sausages and also like Brazilian Linquisas and Chorizo type products (which are distributed in un-cooked condition). The in-situ gelling will reduce seepage during distribution and sales, and will also reduce thawing loss of frozen products, as well as cooking loss.

In-situ gelling is also useful for food products distributed in an uncooked condition, in which the temperature of the center of the product has not been subjected to a temperature greater than 55° C. for meat products, and 40° C. for fish products prior to distribution.

As to food products that can generally be used with any aspect of the present invention, whether using the thixotropic gel food treating composition or the in-situ food treating composition, it is noted that the compositions of the present invention are utilizable with diverse food products. Thus, the food products can comprise meat, poultry and seafood, such as salmon, tuna, and swordfish, For example, by using either gelled or un-gelled food treating compositions according to the present invention, all types of un-cooked meat and seafood products and preparations, pastes and spreads, both coarse and fine minced can be made with either, the un-gelled food treating composition which will principally contribute with sliceability, while the shear thinned thixotropic food treating composition will principally contribute with spreadability. The compositions of the present invention will help reduce or prevent the seepage of juices, will render the preparations, spreads or pastes spreadable or sliceable, and will reduce or eliminate the technical need for use of fats in the pastes and spreads. For example, the preparation, spread or paste can be, but is not limited to, smoked salmon preparation, for example in the form of spread, fine paste or coarse minched or in chunks, e.g., raw smoked salmon, caviar sauce as used in normal caviar production, caviar preparations and caviar paste, herring preparations, spreads and paste, etc. These preparations, spreads and pastes can be "a naturel", spiced or unspiced with or without other raw materials, ingredients or taste components. For example, the preparations, spreads and pastes can also be of a fermented type or directly acidified type, such as meat paste, or spread, such as, teewurst or mettwurst, German traditional spreadable raw sausage products (in some countries called fermented pate, in other countries called tee-sausage, etc. but some variation or another are found in most western countries), and seafood fermented paste, such as, oriental fish paste.

Gelled solution can be incorporated into beef to be used in the production of dry jerky products, such as produced and sold in the USA (as compared to the Latin type which is semi dry), will solve the toughness problem often associated with traditional jerky. By creating upon drying a porous structure and/or texture in the jerky, bite-resistance as compared to traditional jerky will be substantially reduced. The degree of porosity and hence the firmness of the bite or bite resistance can be adjusted by changing the composition of the gelled solution, as well as how much of the solution is incorporated into the beef before drying.

The food products can be any type of meat, poultry or seafood, from wild or domesticated animals with or without bones or skin, whole or in parts, minced, comminuted or emulsified, in any state of natural, fresh, chilled frozen and jerked meats, or in another condition, which is un-cooked.

After the food treating composition of the present invention is added to the food product, and before packaging the surface of the food product can be coated with, for example, spices and/or condiments. Similarly, prior to treatment of the food with the food treating composition according to the present invention, the surface of the food product can be treated with various materials, such as spices, flavour compounds and/or condiments, also batters and breadings. Thus, the food product can be treated both before and after addition of the food treating composition, but preferably after, with coatings of spices, batter and/or breadings.

After adding the food treating composition according to the present invention by injection, it is preferred to let the food product sit (rest) for a period of time. For example, the food product can be permitted to drain for at least about 10 minutes, more preferably at least about 20 minutes, and even more preferably for a period of at least about 60 minutes. Preferred periods of time for draining of the food product after injection include about 10 minutes to 20 minutes, and more preferably about 20 minutes to 60 minutes. When the food product is whole poultry or parts with skin, it is preferred to have a higher resting time in order that food treating composition that is caught between skin and meat can drain out, as only food treating composition which actually gets injected into food product will stay inside.

Still further, it is pointed out that if the food product, such as meat or poultry, is tumbled for 20–40 minutes at about 6 to 10 rpm under vacuum, such as an 80% vacuum, after adding the food composition thereto, such as by injection, there will be lower liquid loss from the product during transport and storage, and more important the consumer will experience lower cooking loss during preparation.

Food products including the gel-in-place technology of the present invention will show less liquid loss during transport, storage and distribution than achievable by other injection methods. Actually, the loss of liquid can be comparable with non-injected products, but even the present gel-in-place technology will normally not completely eliminate liquid loss.

With the gel-in-place technology of the present invention, the consumer will appreciate the reduction of liquid in the packaging, the good appearance of the food product, such as meat, the excellent juiciness of the cooked, broiled or grilled food product, and the clean, natural taste and the low cooking loss compared to other food products, such as those which have been injected with other technologies. Accordingly, the gel-in-place technology of the present invention correctly applied does not lead to complaints concerning excess liquid in the package, complaints about dry meat, and complaints about soy taste, or other non-meat taste.

Another aspect for the food treatment compositions and methods of the present invention, is that they also offer economic advantage of being able to inject or otherwise add large amounts of brine to food products without unacceptable seepage.

The invention will now be described with respect to certain examples which are merely representative of the invention and should not be construed as limiting thereof.

EXAMPLES

The invention is illustrated in the following non-limiting examples, which are provided for the purpose of representation, and are not to be construed as limiting the scope of the invention. All parts and percentages in the examples are by weight unless indicated otherwise.

Preparation and Viscosity Measurements of Compositions

Materials

Silverson model L4RT—heavy duty laboratory mixer/emulsifier using stator-ring having 6 holes of 9 mmØ diameter (produced by Silverson Machines LTD, Waterside, Chesham, Bucks, England, HP5 IPQ)

Brookfield Viscometer model LVT, with placement attachment for securing correct placement of the spindle in the viscosity measurement glass, and adaptor UL and spindles 1–4 used according to the viscosity (produced by Brookfield Engineering Laboratories INC., Stoughton, MA02072, USA)

Cylindrical viscosity measurement glasses made by Pyrex, with internal height of 11 cm and internal diameter of 4.9 cm.

VIT-LAB—2000 ml plastic jug with handle (internal height of 21 cm, bottom internal diameter of 11cm and top internal diameter of 13.5 cm (made in Germany).

Lab scale with 2 decimals ( Mettler Toledo PB3002-S—DeltaRange with 0.01 g precision).

Analytical lab scale with 4 decimals (Sartorius BP 110S with 0.0001 g precision)

Refrigerator at 7° C. (Gram refrigerator type KF195)

Electric heating plate (Kervel type PX, 1500W—produced by Kervel Fabrikken, Sken, Norway).

Cooking pot 2 liter.

Thermometer

Timer

Diverse weighing utilities (beakers, spoons etc.)

Permanent marker

Tap water comprising hard water with a hardness degree of 20–22° dH (hardness measured according to Danish Standard DS250:1973 "Water analysis—Determination of the sum of calcium and magnesium. The method can be used for calculation of hardness.") Using softer water will generally result in improved yield of the polysaccharide used and therefore higher viscosity. Moreover, any reference to tap water in the examples, is hard tap water having a hardness degree of 20–22°dH.

Ion-exchanged water

NaCl obtained from Merck, Sodium Chloride, pro analysis, Merck prod no: 1.06404.1000

Preparation of Solution and Viscosity Measurement

The solutions are prepared to 800 g, unless otherwise specified.

Weigh water on lab scale to 2 decimals, and measure the temperature of the water to ensure it is within +/−1° C. of the of temperature to be utilized in the test.

Measure the water into the 2000 ml plastic jug, and place the 2000 ml plastic jug under the Silverson mixer, and adjust mixing head to be 3–4 cm above the bottom. Use low speed (1000–2000 rpm) on the Silverson mixer, and make sure to avoid air entrapment. Dissolve the salt, and make sure that all the salt is dissolved prior to going to the next step.

Adjust Silverson to 3000 rpm (use higher rpm if viscosity is so high or gelling so firm that 3000 rpm is not enough to keep all the solution in circulation in the plastic jug, and then adjust to the lowest speed above 3000 rpm that keeps the solution in circulation and make sure to avoid air entrapment).

Dissolve the gellable polysaccharide, such as GENU-GEL® carrageenan type X-7524, and make sure to avoid air entrapment, and mix for 3 minutes and stop. Start the viscosity measurement at1 minute of stopping of mixing.

Depending on the viscosity measurements to be made, fill up the 3 viscosity glasses with the solution, and mark them clearly. One can be used immediately for measuring viscosity after preparation, the second viscosity glass can be stored for 24 hours at room temperature (22° C.), and the third viscosity glass can be put into the refrigerator at 7° C. for 24 hours, unless otherwise sated in the examples.

Put lab film (Nescofilm selfsealing—produced by Banda Chemical Ind. Ltd.-Japan) over the viscosity glasses that are stored for 24 h before measurement.

Measure viscosity with Brookfield LVT viscosity meter. Choose adaptor UL or spindles 1 to 4 and rpm according to the viscosity to be measured, at 20° C., unless otherwise stated in the example. Select the correct spindle, attach the center-placement-attachment, then lower the viscosity meter so that the grove in the spindle is in the surface of the solution, then select the correct rpm that produces a reading within the scale of the instrument, and let the viscosity meter run for 60 seconds, then read the measured value, register the value and find in the user manual the correct multiplication factor and find the viscosity and register the calculated value.

Rinse the equipment immediately after use after each test.

Example 1

Preparation of Thixotropic Gel Food Treating Composition

Formulations were prepared utilizing the following procedure to obtain thixotropic gel treating compositions having the weight percentage of ingredients indicated in Table 1, which was prepared based upon 40 kg batches as also indicated in Table 1.

Using a high-speed mixer (Rotostat type XP01, made by Jorgen Jorgensen Ltd, 65 Prags Boulevard, DK-2300 Copenhagen S, Denmark; and using the higher speed: low 1410 rpm/high 2760 rpm) mounted on a brine-preparation-tank (50 cm high cylindrical tank with 40 cm diameter and a conical bottom with discharge valve, made in stainless steel), slowly add agglomerated GENUGEL® carraheenan type X-7524 (made by Hercules Copenhagen A/S) to water having a temperature of about 20° C.

When the carrageenan is completely in solution, and no particles or fisheyes (transparent swelled carrageenan particles) are left, add and dissolve sodium tripolyphosphate (obtained from BK-Ladenburg, Germany), and make sure that the sodium tripolyphosphate is completely in solution before adding the NaCl.

Then add and dissolve the NaCl (from Brøste A/S, Denmark). Then add the ice, and continue to mix until all the ice is melted. This will result in temperature of the composition to be less or about 5° C. Using a multineedle injector (Fomaco automatic multineedle brine injector model FGM 20/40, with 40 needles), which is adjusted for strokes/min and brine pressure as indicated in Table 2, inject bone and skinless turkey breasts with the composition. It is noted that Examples 7–9 were not injectable, and therefore, in this example, the maximum workable concentration of the GENUGEL® carrageenan type X-7524 was below 1 wt %, and concentrations of 0.75 wt % and 0.5 wt % were easily workable.

After injection, permit the injected food products to rest for 10 minutes before being weighed (on Scanvaegt DS-570 digital scale) and packaged (in clear plastic bags 300×500 mm, made of 120my PE, closed with a knot), in order to have brine caught inbetween membranes leak out (brine that does not enter meat is not secured).

For the dryp test, the bags with the injected turkey breast are placed on a shelf in a cooling room having a temperature of 3–5° C., for 6 days. The dryp test is carried out by opening up the bags, removing all liquid from the bags by pouring the liquid out of the bags, and remove the liquid from the surface of the meat by wiping the liquid off by hand, then weighing the turkey breast, and the dryp-loss percentage is then calculated as wt % weight-loss from the injected weight. Results from the dryp-loss test are indicated in Table 2.

The dry turkey breasts from the dryp test are put into vacuum bags (Grace, Cryovac CN 300×500 mm cook-in-bags) and sealed under vacuum on vacuum packaging machine (Röscher VM- 19/S chamber vacuum packaging machine made by Röscherwerke GmbH, Behälterbau und Machinenfabrik—Germany). The packaged turkey breasts are the placed in trays (and on a tray-trolley) and cooked at 80° C. with 100% RH for 3 hours in a cooking-oven (Bastramat smoke and cooking oven Model 701C—made in Germany).

After cooking, the trolley with the vacuum package turkey breasts is removed from the cooking oven and placed at ambient temperature 20° C. for 1 hour and then in a cooling room at 3–5° C. for about 12 to 24 hours.

For the cooking-loss test the vacuum bags are opened and all excess liquid from the bag and the surface of the meat is removed, by pouring out and wiping by hand, respectively, and then the meat is weighed. Cook-loss is then calculated as wt % weight-loss from the weight of the turkey breasts after the dryp-loss measurement.

Results from the cooking-loss measurements are also indicated in Table 2.

TABLE 2

| The Example No. | 1 | 2 | 3 | 4 | 5 | 6 |
|---|---|---|---|---|---|---|
| Dry Weight (kg) | 8.19 | 8.342 | 7.861 | 8.814 | 8.516 | 8.179 |
| After Injection (kg) | 10.1 | 10.41 | 9.874 | 10.995 | 10.708 | 9.992 |
| Kg. Injected | 2.00 | 2.075 | 36568 | 2.181 | 2.192 | 1.813 |
| % Injected | 24.4 | 24.87 | 25.61 | 24.74 | 25.7 | 22.17 |
| Injector, Brine Pressure (bar) | 2.2 | 2 | 1.8 | 1.8 | 1.5 | 1.2 |
| Injector, Strokes/Minute | 30 | 30 | 30 | 30 | 30 | 30 |
| Dry, After Cool Store | 9.51 | 9.733 | 9.298 | 10.389 | 10.374 | 9.862 |
| Dryp (kg) | 0.67 | 0.684 | 0.576 | 0.606 | 0.334 | 0.13 |
| Dryp (%) | 6.66 | 6.57 | 5.83 | 5.51 | 3.12 | 1.3 |
| Dry, After Cooking | 7.94 | 8.255 | 7.91 | 8.843 | 9.012 | 8.748 |
| Cooking-Loss (kg) | 1.57 | 1.478 | 1.388 | 1.546 | 1.362 | 1.114 |
| Cooking-Loss (%) | 16.5 | 15.19 | 14.93 | 14.88 | 13.13 | 11.3 |

Example 2

This example is directed to the preparation of two solutions which are identical in composition but prepared in two different ways, first by using the method according to the present invention, and the second method according to prior art. A third solution is also prepared, using the method described in the present invention where additional GENUGEL Carrageenan X-7524 is added after gellation of the first addition of GENUGEL Carrageeenan X-7524, where this second addition will remain un-dissolved/un-hydrated, and thereby not affecting notably the viscosity of the food treatment composition.

Formulations expressed in percentage wt %, and expressed in kg's for making 40 kg batches of food treating composition. Ingredients included in the composition are indicated in Table 3 below.

TABLE 1

| | Ex. No. | | | | | | | | |
|---|---|---|---|---|---|---|---|---|---|
| | 1 | 2 | 3 | 4 | 5 | 6 | 7 | 8 | 9 |
| INDICATED AS WEIGHT PERCENT | | | | | | | | | |
| Water (wt %) | 73 | 72.975 | 72.95 | 72.9 | 72.5 | 72.25 | 72 | 71.75 | 71.5 |
| Ice (wt %) | 25 | 25 | 25 | 25 | 25 | 25 | 25 | 25 | 25 |
| Sodium | 1 | 1 | 1 | 1 | 1 | 1 | 1 | 1 | 1 |
| NaCl (wt %) | 1 | 1 | 1 | 1 | 1 | 1 | 1 | 1 | 1 |
| Genugel X-7524 (wt %) | 0 | 0.025 | 0.05 | 0.1 | 0.5 | 0.75 | 1 | 1.25 | 1.5 |
| Total (wt %) | 100 | 100 | 100 | 100 | 100 | 100 | 100 | 100 | 100 |
| INDICATEDE AS BASED UPON 40 KG TOTAL WEIGHT | | | | | | | | | |
| Water (kg) | 29.2 | 29.19 | 29.18 | 29.16 | 29 | 28.9 | 28.8 | 28.7 | 28.6 |
| Ice (kg) | 10 | 10 | 10 | 10 | 10 | 10 | 10 | 10 | 10 |
| Sodium | 0.4 | 0.4 | 0.4 | 0.4 | 0.4 | 0.4 | 0.4 | 0.4 | 0.4 |
| NaCl (kg) | 0.4 | 0.4 | 0.4 | 0.4 | 0.4 | 0.4 | 0.4 | 0.4 | 0.4 |
| Genugel X-7524 | — | 0.01 | 0.02 | 0.04 | 0.2 | 0.3 | 0.4 | 0.5 | 0.6 |
| Total | 40 | 40 | 40 | 40 | 40 | 40 | 40 | 40 | 40 |

Formulations 1 and 3

Using a high-speed mixer (Rotostat type XP01, made by Jorgen Jorgensen Ltd, 65 Prags Boulevard, DK-2300 Copenhagen S, Denmark; and using the higher speed: low 1410rpm/high 2760 rpm) mounted on a brine-preparation-tank (50 cm high cylindrical tank with 40 cm diameter and a conical bottom with discharge valve, made in stainless steel), slowly add agglomerated GENUGEL(® carrageenan type X-7524 (made by Hercules Copenhagen A/S) to water having a temperature of approximately 20° C.—(for formulation 3, only the first part of GENUGEL® carrageenan type X-7524 is added here).

When the carrageenan is completely in solution, and no particles or fisheyes (transparent swelled carrageenan particles) are left, add and dissolve the phosphate (Sodium tripolyphosphate obtained from BK-Ladenburg, Germany), and make sure that the phosphate is completely in solution before adding the NaCl.

Then add and dissolve the NaCl (from Brøste A/S, Denmark). Then add the ice, and continue to mix until all the ice is melted. This will result in temperature of the composition to be less or about 5° C.

For formulation 3: After the salt is dissolved add the second addition of GENUGEL® carrageenan type X-7524.

Formulation 2

Using the same method as for formulations 1 and 3, but with the exception of adding all of the GENUGEL® carrageenan type X-7524 after having dissolved the phosphate and the NaCl.

Using a multineedle injector (Fomaco automatic multineedle brine injector model FGM 20/40, with 40 needles) (for adjustment of strokes/min and brine pressure refer to Table 2) inject the bone and skinless turkey breasts with the composition.

After injection the meat rests 10 minutes before being weighed (on Scanvaegt DS-570 digital scale) and packaged (in clear plastic bags 300×500 mm, made of 120my PE, closed with a knot), in order to have brine caught in-between membranes leak out (brine that does not enter meat is not secured).

For the dryp test the bags with the injected turkey breast are placed on a shelf in a cooling room having a temperature of 3–5° C., for 5 days. The dryp test is carried out by opening up the bags, removing all liquid from the bag and from the surface of the meat by hand wiping, then weighting the turkey breast, and the dryp-loss percentage is then calculated as wt % weight-loss from the injected weight. Results from the dryp-loss test are depicted in Table 4.

Now the dry turkey breasts from the dryp test are put into vacuum bags (Grace, Cryovac CN 300×500 mm cook-in-bags) and sealed under vacuum on vacuum packaging machine (Röscher VM-19/S chamber vacuum packaging machine made by Röscherwerke GmbH, Behälterbau und Machinenfabrik—Germany), then the packaged turkey breasts are placed in trays (and on a tray-trolley) and cooked at 80° C. with 100% RH for 3 hours in a cooking-oven (Bastramat smoke and cooking oven Model 701C—made in Germany).

After cooking, the trolley with the vacuum package turkey breasts is removed from the cooking oven and placed at ambient temperature 20° C. for 1 hour and then in cooling room at 3–5° C. for about 1 hour.

For the cooking-loss test the vacuum bags are opened and all excess liquid from the bag and the surface of the meat is removed and then the meat is weighed. Cooking-loss is then calculated as wt % weight-loss from the weight of the turkey breasts after the dryp-loss measurement. Results from the cooking-loss measurements are depicted in Table 4.

TABLE 3

Turkey Breast with approx. 30% weight gain
Test for illustrating the benefits of the present invention compared to prior art methods

| Brine formulations % | 1. Brine wt % | 2. Brine wt % | 3. Brine wt % |
|---|---|---|---|
| Water | 72.5 | 72.5 | 72 |
| Ice | 25 | 25 | 25 |
| Sodiumtripolyphosphate | 1 | 1 | 1 |
| NaCl | 1 | 1 | 1 |
| Genugel X-7524-before salts | 0.5 | | 0.5 |
| Genugel X-7524-after salts | | 0.5 | 0.5 |
| total | 100 | 100 | 100 |

| Brines, 40 kg each | 1. kg | 2. kg | 3. kg |
|---|---|---|---|
| Water | 29.000 | 29.000 | 28.800 |
| Ice | 10.000 | 10.000 | 10.000 |
| Sodiumtripolyphosphate | 0.400 | 0.400 | 0.400 |
| NaCl | 0.400 | 0.400 | 0.400 |
| Genugel X-7524-before salts | 0.200 | | 0.200 |
| Genugel X-7524-after salts | | 0.200 | 0.200 |
| total | 40.000 | 40.000 | 40.000 |

TABLE 4

Injection, dryp-loss and cooking loss tests

| | 1. kg | 2. kg | 3. kg |
|---|---|---|---|
| Dry weight | 5.502 | 5.567 | 5.362 |
| After inject. | 7.057 | 7.254 | 6.945 |
| kg. injected | 1.555 | 1.687 | 1.583 |
| % injected | 28.26 | 30.30 | 29.52 |
| Injector, brine pressure | 1.4 bar | 2.5 bar | 1.5 bar |
| Injector, strokes/minute | 30 | 30 | 30 |
| Dry, after cool store | 6.897 | 6.804 | 6.865 |
| dryp in kg | 0.16 | 0.450 | 0.080 |
| dryp in % | 2.27 | 6.20 | 1.15 |
| Dry, after cooking | 5.917 | 5.464 | 5.960 |
| cooking-loss in kg | 0.98 | 1.340 | 0.905 |
| cooking-loss in % | 14.21 | 19.69 | 13.18 |

Example 3A–3F

These examples demonstrate a range of most effective salt concentrations, for viscosity and carrageenan use level adjustments. This example also shows a range of salt concentrations where the different carrageenan types hydrate/swell or dissolve sufficiently to produce useful viscosity in tap water at 20° C.

Soluble salts in solution suppress solubility of polysaccharides, such as carrageenan, with different salts having different effects, thereby reducing the viscosity of the resulting solution. Increasing the concentration of salt in solution will allow higher use levels of polysaccharide, such as carrageenan, while keeping the viscosity within a workable range.

Thus, these examples demonstrate a range of salt concentrations where solubility of carrageenan is most affected. In these tests, salt is not added in order to gel the dissolved carrageenan and create a thixotropic food treating composition. The objective of is these examples is to demonstrate the influence of salt in solution on the solubility of various polysaccharides, such as carrageenan types. The solubility is here expressed as viscosity in cps.

1 wt % carrageenan is added to ion-exchanged water and normal tap water at 20° C. without any salt dissolved, and then to tap water at 20° C., with 0.1 wt %–4 wt % NaCl dissolved before the addition of the carrageenan.

The carrageenan types tested are GENUGEL® Carrageenan type X-7524, GENUVISCO® Carrageenan type J, GENUGEL® Carrageenan type C-59, GENUGEL® Carrageenan type C-160, GENUGEL® Carrageenan type C-151 and GENUGEL® Carrageenan type C-209.

In Tables 5A to 5F below are the exact weight of each component used in the tests illustrated in Tables 5A-1 to 5F-1. Moreover Table 5A-1 show an additional example at the bottom thereof.

TABLE 5A

|  | ion-ex water | tap water 0% | 0.05% NaCl | 0.10% NaCl | 0.25% NaCl | 0.50% NaCl | 0.75% NaCl | 1.00% NaCl | 1.25% NaCl | 1.50% NaCl | 2.00% NaCl | 3.00% NaCl | 4.00% NaCl |
|---|---|---|---|---|---|---|---|---|---|---|---|---|---|
| ion-exch. water, gr | 792 | | | | | | | | | | | | |
| tap water, gr | | 792 | 791.6 | 791.2 | 790 | 788 | 786 | 784 | 782 | 780 | 776 | 768 | 760 |
| NaCl, gr | | | 0.4 | 0.8 | 2 | 4 | 6 | 8 | 10 | 12 | 16 | 24 | 32 |
| Genugel X-7524, gr | 8 | 8 | 8 | 8 | 8 | 8 | 8 | 8 | 8 | 8 | 8 | 8 | 8 |

TABLE 5B

|  | ion-ex water | tap water 0% | 0.05% NaCl | 0.10% NaCl | 0.25% NaCl | 0.50% NaCl | 0.75% NaCl | 1.00% NaCl | 1.25% NaCl | 1.50% NaCl | 2.00% NaCl | 3.00% NaCl | 4.00% NaCl |
|---|---|---|---|---|---|---|---|---|---|---|---|---|---|
| ion-exch. water, gr | 792 | | | | | | | | | | | | |
| tap water, gr | | 792 | 791.6 | 791.2 | 790 | 788 | 786 | 784 | 782 | 780 | 776 | 768 | 760 |
| NaCl, gr | | | 0.4 | 0.8 | 2 | 4 | 6 | 8 | 10 | 12 | 16 | 24 | 32 |
| Genuvisco J, gr | 8 | 8 | 8 | 8 | 8 | 8 | 8 | 8 | 8 | 8 | 8 | 8 | 8 |

TABLE 5C

|  | ion-ex water | tap water 0% | 0.05% NaCl | 0.10% NaCl | 0.25% NaCl | 0.50% NaCl | 0.75% NaCl | 1.00% NaCl | 1.25% NaCl | 1.50% NaCl | 2.00% NaCl | 3.00% NaCl | 4.00% NaCl |
|---|---|---|---|---|---|---|---|---|---|---|---|---|---|
| ion-exch. water, gr | 792 | | | | | | | | | | | | |
| tap water, gr | | 792 | 791.6 | 791.2 | 790 | 788 | 786 | 784 | 782 | 780 | 776 | 768 | 760 |
| NaCl, gr | | | 0.4 | 0.8 | 2 | 4 | 6 | 8 | 10 | 12 | 16 | 24 | 32 |
| Genugel C-59, gr | 8 | 8 | 8 | 8 | 8 | 8 | 8 | 8 | 8 | 8 | 8 | 8 | 8 |

TABLE 5D

|  | ion-ex water | tap water 0% | 0.05% NaCl | 0.10% NaCl | 0.25% NaCl | 0.50% NaCl | 0.75% NaCl | 1.00% NaCl | 1.25% NaCl | 1.50% NaCl | 2.00% NaCl | 3.00% NaCl | 4.00% NaCl |
|---|---|---|---|---|---|---|---|---|---|---|---|---|---|
| ion-exch. water, gr | 792 | | | | | | | | | | | | |
| tap water, gr | | 792 | 791.6 | 791.2 | 790 | 788 | 786 | 784 | 782 | 780 | 776 | 768 | 760 |
| NaCl, gr | | | 0.4 | 0.8 | 2 | 4 | 6 | 8 | 10 | 12 | 16 | 24 | 32 |
| Genugel C-160, gr | 8 | 8 | 8 | 8 | 8 | 8 | 8 | 8 | 8 | 8 | 8 | 8 | 8 |

TABLE 5E

|  | ion-ex water | tap water 0% | 0.05% NaCl | 0.10% NaCl | 0.25% NaCl | 0.50% NaCl | 0.75% NaCl | 1.00% NaCl | 1.25% NaCl | 1.50% NaCl | 2.00% NaCl | 3.00% NaCl | 4.00% NaCl |
|---|---|---|---|---|---|---|---|---|---|---|---|---|---|
| ion-exch. water, gr | 792 | | | | | | | | | | | | |
| tap water, gr | | 792 | 791.6 | 791.2 | 790 | 788 | 786 | 784 | 782 | 780 | 776 | 768 | 760 |
| NaCl, gr | | | 0.4 | 0.8 | 2 | 4 | 6 | 8 | 10 | 12 | 16 | 24 | 32 |
| Genugel C-151, gr | 8 | 8 | 8 | 8 | 8 | 8 | 8 | 8 | 8 | 8 | 8 | 8 | 8 |

TABLE 5F

|  | ion-ex water | tap water 0% | 0.05% NaCl | 0.10% NaCl | 0.25% NaCl | 0.50% NaCl | 0.75% NaCl | 1.00% NaCl | 1.25% NaCl | 1.50% NaCl | 2.00% NaCl | 3.00% NaCl | 4.00% NaCl |
|---|---|---|---|---|---|---|---|---|---|---|---|---|---|
| ion-exch. water, gr | 792 | | | | | | | | | | | | |
| tap water, gr | | 792 | 791.6 | 791.2 | 790 | 788 | 786 | 784 | 782 | 780 | 776 | 768 | 760 |
| NaCl, gr | | | 0.4 | 0.8 | 2 | 4 | 6 | 8 | 10 | 12 | 16 | 24 | 32 |
| Genugel C-209, gr | 8 | 8 | 8 | 8 | 8 | 8 | 8 | 8 | 8 | 8 | 8 | 8 | 8 |

TABLE 5A-1

| % NaCl in solution before addition of 1% Genugel X-7524 % | Immediately after preparation at 22° C. CPS | Visc. meas. Br. field LVT spindle | rpm | after 24 h at 22° C. CPS | Visc. meas. Br. field LVT spindle | rpm | after 24 h at 22 C. CPS | Visc. meas. Br. field LVT spindle | rpm |
|---|---|---|---|---|---|---|---|---|---|
| ion-exchanged water | 42 | 1 | 60 | 41 | 1 | 60 | 62.5 | 1 | 60 |
| 0 | 1920 | 3 | 30 | 2480 | 3 | 30 | 6900 | 4 | 30 |
| 0.05 | 1700 | 3 | 30 | 2300 | 3 | 30 | 8450 | 3 | 12 |
| 0.10 | 1708 | 3 | 30 | 2448 | 3 | 30 | 6400 | 4 | 30 |
| 0.25 | 264 | 3 | 30 | 864 | 3 | 30 | 984 | 3 | 30 |
| 0.50 | 36 | 1 | 30 | 212 | 3 | 30 | 44 | 1 | 30 |
| 0.75 | 9.1 | 1 | 60 | 66 | 1 | 60 | 16 | 1 | 60 |
| 1.00 | 7.5 | 1 | 60 | 24 | 1 | 60 | 10.7 | 1 | 60 |
| 1.25 | 6 | 1 | 60 | 15.5 | 1 | 60 | 8 | 1 | 60 |
| 1.50 | 6 | 1 | 60 | 10.5 | 1 | 60 | 7.8 | 1 | 60 |
| 2.00 | 5 | 1 | 60 | 9 | 1 | 60 | 6.5 | 1 | 60 |
| 3.00 | 4.5 | 1 | 60 | 6 | 1 | 60 | 5.3 | 1 | 60 |
| 4.00 | 4.5 | 1 | 60 | 6 | 1 | 60 | 5.5 | 1 | 60 |

| % NaCl in solution before addition of carrageenan % | Immediately after preparation at 22 C. CPS | Visc. meas. Br. field LVT spindle | rpm | after 10 min at 22 C. CPS | Visc. meas. Br. field LVT spindle | rpm | after 3 h at 22 C. CPS | Visc. meas. Br. field LVT spindle | rpm | spindle: 3, rpm 30 after 24 h at 22 C. CPS |
|---|---|---|---|---|---|---|---|---|---|---|
| 0.1 | 1708 | 3 | 30 | 2420 | 3 | 30 | 2860 | 3 | 30 | 2448 |

TABLE LAB 5B-1

| % NaCl in solution before addition of 1% Genuvisco J carrageenan % | Immediately after preparation at 22 C. CPS | Visc. meas. Br. field LVT spindle | rpm | after 24 h at 22 C. CPS | Visc. meas. Br. field LVT spindle | rpm | after 24 h at 7 C. CPS | Visc. meas. Br. field LVT spindle | rpm |
|---|---|---|---|---|---|---|---|---|---|
| ion-exchanged water | 1340 | 3 | 30 | 2800 | 3 | 30 | 4200 | 4 | 30 |
| 0 | 13.5 | 1 | 60 | 32.5 | 1 | 60 | 19.5 | 1 | 60 |
| 0.10 | 18 | 1 | 60 | 43 | 1 | 60 | 42 | 1 | 60 |
| 0.25 | 8 | 1 | 60 | 17.5 | 1 | 60 | 10.5 | 1 | 60 |
| 0.50 | 7.5 | 1 | 60 | 13.5 | 1 | 60 | 9.5 | 1 | 60 |
| 0.75 | 7 | 1 | 60 | 10.5 | 1 | 60 | 9 | 1 | 60 |
| 1.00 | 7 | 1 | 60 | 8.5 | 1 | 60 | 8.5 | 1 | 60 |
| 1.25 | 7 | 1 | 60 | 8 | 1 | 60 | 8 | 1 | 60 |
| 1.50 | 6 | 1 | 60 | 8 | 1 | 60 | 7.5 | 1 | 60 |
| 2.00 | 5.5 | 1 | 60 | 7.5 | 1 | 60 | 6.5 | 1 | 60 |
| 3.00 | 4.5 | 1 | 60 | 5.5 | 1 | 60 | 6 | 1 | 60 |
| 4.00 | 4 | 1 | 60 | 5 | 1 | 60 | 5.5 | 1 | 60 |

TABLE LAB 5C-1

| % NaCl in solution before addition of 1% C-59 carrageenan % | Immediately after preparation at 22 C. CPS | Visc. meas. Br. field LVT spindle | rpm | after 24 h at 22 C. CPS | Visc. meas. Br. field LVT spindle | rpm | after 24 h at 7 C. CPS | Visc. meas. Br. field LVT spindle | rpm |
|---|---|---|---|---|---|---|---|---|---|
| ion-exchanged water | 23 | 1 | 60 | 24 | 1 | 60 | 2760 | 3 | 30 |
| 0 | 164 | 1 | 30 | 352.5 | 1 | 12 | 560 | 3 | 30 |
| 0.1 | 58 | 1 | 60 | 91.5 | 1 | 60 | 347 | 1 | 12 |
| 0.25 | 30.5 | 1 | 60 | 60 | 1 | 60 | 54.9 | 1 | 60 |

TABLE LAB 5C-1-continued

| % NaCl in solution before addition of 1% C-59 carrageenan % | Immediately after preparation at 22 C. CPS | Visc. meas. Br. field LVT spindle | rpm | after 24 h at 22 C. CPS | Visc. meas. Br. field LVT spindle | rpm | after 24 h at 7 C. CPS | Visc. meas. Br. field LVT spindle | rpm |
|---|---|---|---|---|---|---|---|---|---|
| 0.50 | 19.5 | 1 | 60 | 36 | 1 | 60 | 31.5 | 1 | 60 |
| 0.75 | 12 | 1 | 60 | 19.5 | 1 | 60 | 15.5 | 1 | 60 |
| 1.00 | 9.5 | 1 | 60 | 12 | 1 | 60 | 10.5 | 1 | 60 |
| 1.25 | 7 | 1 | 60 | 9 | 1 | 60 | 8 | 1 | 60 |
| 1.50 | 6 | 1 | 60 | 7.5 | 1 | 60 | 7.5 | 1 | 60 |
| 2.00 | 5 | 1 | 60 | 5.5 | 1 | 60 | 5 | 1 | 60 |
| 3.00 | 4.5 | 1 | 60 | 4.5 | 1 | 60 | 4.5 | 1 | 60 |
| 4.00 | 4 | 1 | 60 | 3.5 | 1 | 60 | 4 | 1 | 60 |

TABLE 5D-1

| % NaCl in solution before addition of 1% C-160 carrageenan % | Immediately after preparation at 22 C. CPS | Visc. meas. Br. field LTV spindle | rpm | after 24 h at 22 C. CPS | Visc. meas. Br. field LTV spindle | rpm | after 24 h at 7 C. CPS | Visc. meas. Br. field LVT spindle | rpm |
|---|---|---|---|---|---|---|---|---|---|
| ion-exchanged water | 100 | 3 | 30 | 110 | 3 | 60 | 10400 | 4 | 30 |
| 0 | 840 | 3 | 30 | 2700 | 4 | 30 | *3875 | 4 | 30 |
| 0.1 | 940 | 3 | 30 | 2000 | 4 | 30 | *2700 | 4 | 30 |
| 0.25 | 620 | 3 | 30 | 1200 | 3 | 30 | *2200 | 4 | 30 |
| 0.50 | 400 | 1 | 12 | 580 | 3 | 30 | 940 | 3 | 30 |
| 0.75 | 20 | 1 | 60 | 120 | 1 | 30 | 110 | 3 | 60 |
| 1.00 | 7 | 1 | 60 | 9 | 1 | 60 | 7.5 | 1 | 60 |
| 1.25 | 5.5 | 1 | 60 | 6 | 1 | 60 | 5 | 1 | 60 |
| 1.50 | 5 | 1 | 60 | 4.5 | 1 | 60 | 5 | 1 | 60 |
| 2.00 | 3.5 | 1 | 60 | 4.5 | 1 | 60 | 4.5 | 1 | 60 |
| 3.00 | 3 | 1 | 60 | 3.5 | 1 | 60 | 3.5 | 1 | 60 |
| 4.00 | 3 | 1 | 60 | 3 | 1 | 60 | 4 | 1 | 60 |

*were not measurable, because the spindle makes a hole around itself
*these 3 measurements are therefore unreliable and thereby excluded

TABLE 5E-1

| % NaCl in solution before addition of 1% C-151 carrageenan % | Immediately after preparation at 22 C. CPS | Visc. meas. Br. field LTV spindle | rpm | after 24 h at 22 C. CPS | Visc. meas. Br. field LTV spindle | rpm | after 24 h at 7 C. CPS | Visc. meas. Br. field LVT spindle | rpm |
|---|---|---|---|---|---|---|---|---|---|
| ion-exchanged water | 1440 | 3 | 30 | 7100 | 4 | 30 | 11200 | 4 | 30 |
| 0 | 5 | 1 | 60 | 5.5 | 1 | 60 | 6 | 1 | 60 |
| 0.10 | 6 | 1 | 60 | 14.5 | 1 | 60 | 19 | 1 | 60 |
| 0.25 | 5 | 1 | 60 | 11 | 1 | 60 | 18 | 1 | 60 |
| 0.50 | 4.5 | 1 | 60 | 16 | 1 | 60 | 9 | 1 | 60 |
| 0.75 | 5 | 1 | 60 | 9 | 1 | 60 | 14.5 | 1 | 60 |
| 1.00 | 4.5 | 1 | 60 | 16 | 1 | 60 | 8.5 | 1 | 60 |
| 1.25 | 4 | 1 | 60 | 4 | 1 | 60 | 6 | 1 | 60 |
| 1.5 | 3.5 | 1 | 60 | 3.5 | 1 | 60 | 4.5 | 1 | 60 |
| 2.00 | 4 | 1 | 60 | 3.5 | 1 | 60 | 4.5 | 1 | 60 |
| 3.00 | 3 | 1 | 60 | 3 | 1 | 60 | 4 | 1 | 60 |
| 4.00 | 3.5 | 1 | 60 | 3.5 | 1 | 60 | 4 | 1 | 60 |

TABLE 5F-1

| % NaCl in solution before addition of 1% C-209 carrageenan % | Immediately after preparation at 22 C. CPS | Visc. meas. Br. field LTV spindle | rpm | after 24 h at 22 C. CPS | Visc. meas. Br. field LTV spindle | rpm | after 24 h at 7 C. CPS | Visc. meas. Br. field LVT spindle | rpm |
|---|---|---|---|---|---|---|---|---|---|
| ion-exchanged water | 180 | 3 | 30 | 182 | 1 | 30 | 640 | 3 | 30 |
| 0 | 3060 | 3 | 30 | 3800 | 4 | 30 | 11100 | 1 | 30 |
| 0.10 | 2040 | 3 | 30 | 5800 | 4 | 30 | 13200 | 4 | 30 |
| 0.25 | 540 | 3 | 30 | 6200 | 4 | 30 | 3000 | 4 | 30 |
| 0.50 | 73.5 | 1 | 60 | 2700 | 4 | 30 | 220 | 3 | 60 |

TABLE 5F-1-continued

| % NaCl in solution before addition of 1% C-209 carrageenan % | Immediately after preparation at 22 C. CPS | Visc. meas. Br. field LTV spindle | rpm | after 24 h at 22 C. CPS | Visc. meas. Br. field LTV spindle | rpm | after 24 h at 7 C. CPS | Visc. meas. Br. field LVT spindle | rpm |
|---|---|---|---|---|---|---|---|---|---|
| 0.75 | 20.5 | 1 | 60 | 580 | 3 | 30 | 63 | 1 | 60 |
| 1.00 | 13.5 | 1 | 60 | 160 | 3 | 30 | 38 | 1 | 60 |
| 1.25 | 9 | 1 | 60 | 141 | 1 | 30 | 17.5 | 1 | 60 |
| 1.5 | 8 | 1 | 60 | 57.5 | 1 | 60 | 19.5 | 1 | 60 |
| 2.00 | 6.5 | 1 | 60 | 25.5 | 1 | 60 | 9 | 1 | 60 |
| 3.00 | 5.5 | 1 | 60 | 12 | 1 | 60 | 8 | 1 | 60 |
| 4.00 | 5 | 1 | 60 | 9 | 1 | 60 | 7 | 1 | 60 |

As can be seen from a review of Tables 5A-1 to 5F-1, each of the carrageenans shows the same tendency, irrespective of carrageenan type, that rising salt concentrations give falling viscosity in the solutions.

The carrageenan types that show low initial viscosity in ion-exchanged water and show higher viscosity in tap water and when small amount of salt is present, are the most soluble types at this temperature, and therefore the preferred types, at this preparation temperature, for the thixotropic food composition and the gel-in-place food treating compositions according to the present invention.

The carrageenan types that show high initial viscosity in ion-exchanged water lo and then fall fast in viscosity, or loose almost completely the viscosity, when in tap water, are the less soluble types at this temperature, and these types are therefore less preferable in this invention, at this preparation temperature, although they can be used in both embodiments of this invention at this temperature if the water used is ion-exchanged (or very soft or that the hardness in hard water is sequestered using sequestrants, such as for example sodium hexametaphosphate).

It can be seen that each carrageenan type behaves in a different manner as to the salt concentration at which is has its highest and lowest viscosity.

Example 4

This example 2 shows measurements of the maximum viscosity of food treating compositions, which can be prepared using conventional brine mixers and is injectable using conventional multi-needle-injectors, according to Example 1. This example also shows measurements of viscosity of food treating compositions with the lowest functional concentrations of GENUGEL® carrageenan type X-7524 that give at least some reduction in dryp loss of injected turkey breast during storage.

All injectors have a maximum viscosity they can handle, but more importantly all meat industry brine preparation systems have a maximum viscosity they can handle and this viscosity is in some cases lower than the injectors can handle. This example therefore seeks to measure viscosity of brine where carrageenan is dissolved before any salt addition, using the already established maximum workable carrageenan use levels, according to Example 1.

Water at 20° C., using both tap water and ion-exchanged water 0.025%, 0.05%, 0.10%, 0.20%, 0.30%, 0.40% and also 0.5% and 0.75 wt % GENUGEL® carrageenan type X-7524 (established as maximum use level when used in the preferred method of making thixotropic food treating composition—as in Example 1.

In Table 6A-6D below are the exact weight of each component used in this example.

TABLE 6A

| | 0.025% X-7524 in tap water gr | 0.025% X-7524 in ion-exch. water gr | 0.05% X-7524 in tap water gr | 0.05% X-7524 in ion exch. water gr |
|---|---|---|---|---|
| ion-exch. water, gr | | 783.8 | | 783.6 |
| tap water, gr | 783.8 | | 783.6 | |
| NaCl, gr | 16 | 16 | 16 | 16 |
| Genugel X-7524, gr | 0.2 | 0.2 | 0.4 | 0.4 |

TABLE 6B

| | 0.1% X-7524 in tap water gr | 0.1% X-7524 in ion-exch. water gr | 0.2% X-7524 in tap water gr | 0.2% X-7524 in ion-exch. water gr |
|---|---|---|---|---|
| ion-exch. water, gr | | 783.2 | | 782.4 |
| tap water, gr | 783.2 | | 782.4 | |
| NaCl, gr | 16 | 16 | 16 | 16 |
| Genugel X-7524, gr | 0.8 | 0.8 | 1.6 | 1.6 |

TABLE 6C

| | 0.3% X-7524 in tap water gr | 0.3% X-7524 in ion exch. water gr | 0.4% X-7524 in tap water gr | 0.4% X-7524 in ion-exch. water gr |
|---|---|---|---|---|
| ion-exch. water, gr | | 781.6 | | 780.8 |
| tap water, gr | 781.6 | | 780.8 | |
| NaCl, gr | 16 | 16 | 16 | 16 |
| Genugel X-7524, gr | 2.4 | 2.4 | 3.2 | 3.2 |

TABLE 6D

|  | 0.5% X-7524 in tap water gr | 0.5% X-7524 in ion-exch. water gr | 0.75% X-7524 in tap water gr | 0.75% X-7524 in ion-exch. water gr |
|---|---|---|---|---|
| ion-exch. water, gr |  | 780 |  | 780 |
| tap water, gr | 780 |  | 780 |  |
| NaCl, gr | 16 | 16 | 16 | 16 |
| Genugel X-7524, gr | 4 | 4 | 4 | 4 |

In Table 6A-1 to 6D-1, the huge effect, on viscosity, of salt addition to a carrageenan solution, can be seen.

The maximum workable viscosity for Fomaco FGM 20/40 multineedle injector is measured to be 780 cps. This viscosity of approximately 800 cps is still reasonable to work with. Also, somewhat higher viscosities can be used with this injector model, but will require extra care and patience. Viscosities over 1000 cps have been injected using this injector, but such high viscosities are not practical for use with this injector type, due to excessive reduction of the injectors production capacity.

The minimum viscosity of food treating composition when using the minimum concentrations of GENUGEL® carrageenan type X-7524 that at least show some reduction of dryp loss of injected turkey breast during storage, is almost down to viscosity of water which is defined as having viscosity of 1. The low viscosity measurements are carried out using an UL (low viscosity adapter) on the Brookfield LVT Viscometer. This adapter gives the solution relatively high shear compared to for example spindle 1–4, and therefore the viscosity measurements obtained with the UL adapter in place, when measuring the gelled shear thinned food treatment composition are very low. So when using the UL adapter the viscosity readings obtained are perhaps more showing the real lowest viscosity during pumping like when the food treatment composition is inside the pumping system of a multi-needle-injector.

TABLE 6A-1

|  | Before NaCl addition at 22° C. CPS | Visc. meas. Br. field LVT spindle | rpm | After 2% NaCl addition at 22° C. CPS | Visc. meas. Br. field LVT spindle | rpm | after 24 h at 22° C. CPS | Visc. meas. Br. field LVT spindle | rpm | after 24 h at 7° C. CPS | Visc. meas. Br. field LVT spindle | rpm |
|---|---|---|---|---|---|---|---|---|---|---|---|---|
| 0.025% X-7524, in tap water | 1.2 | UL | 60 | 1.25 | UL | 60 | 1.1 | UL | 60 | 1.45 | UL | 60 |
| 0.1% X-7524, in ion-exch. water | 3.3 | UL | 60 | 1.15 | UL | 60 | 1.15 | UL | 60 | 1.55 | UL | 60 |
| 0.05% X-7524, in tap water | 1.3 | UL | 60 | 1.3 | UL | 60 | 1.1 | UL | 60 | 1.45 | UL | 60 |
| 0.05% X-7524, in ion-exch. water | 1.55 | UL | 60 | 1.25 | UL | 60 | 1.3 | UL | 60 | 1.9 | UL | 60 |

TABLE 6B-1

|  | Before NaCl addition at 22° C. CPS | Visc. meas. Br. field LVT spindle | rpm | After 2% NaCl addition at 22° C. CPS | Visc. meas. Br. field LVT spindle | rpm | after 24 h at 22° C. CPS | Visc. meas. Br. field LVT spindle | rpm | after 24 h at 7° C. CPS | Visc. meas. Br. field LVT spindle | rpm |
|---|---|---|---|---|---|---|---|---|---|---|---|---|
| 0.1% X-7524, in tap water | 1.45 | UL | 60 | 1.45 | UL | 60 | 1.2 | UL | 60 | 1.7 | UL | 60 |
| 0.1% X-7524, in ion-exch. water | 1.95 | UL | 60 | 1.95 | UL | 60 | 2.35 | UL | 60 | 3.45 | UL | 60 |
| 0.2% X-7524, in tap water | 2.2 | UL | 60 | 1.9 | UL | 60 | 2.05 | UL | 60 | 2.25 | UL | 60 |
| 0.2% X-7524, in ion-exch. water | 8 | 1 | 60 | 20.5 | 1 | 60 | 40 | 1 | 60 | 75 | 1 | 60 |

TABLE 6C-1

|  | Before NaCl addition at 22° C. CPS | Visc. meas. Br. field LVT spindle | rpm | After 2% NaCl addition at 22° C. CPS | Visc. meas. Br. field LVT spindle | rpm | after 24 h at 22° C. CPS | Visc. meas. Br. field LVT spindle | rpm | after 24 h at 7° C. CPS | Visc. meas. Br. field LVT spindle | rpm |
|---|---|---|---|---|---|---|---|---|---|---|---|---|
| 0.3% X-7524, in tap water | 3.7 | UL | 60 | 2.7 | UL | 60 | 2.95 | UL | 60 | 3.45 | UL | 60 |
| 0.3% X-7524, in ion-exch. water | 10.5 | 1 | 60 | 173 | 1 | 30 | 300 | 3 | 30 | 600 | 3 | 30 |
| 0.4% X-7524, in tap water | 23.5 | 1 | 60 | 20 | 1 | 60 | 28.5 | 1 | 60 | 52.5 | 1 | 60 |
| 0.4% X-7524, in ion-exch. water | 17 | 1 | 30 | 560 | 3 | 30 | 600 | 3 | 30 | 1040 | 3 | 30 |

TABLE 6D-1

|  | Before NaCl addition at 22° C. CPS | Visc. meas. Br. field LVT spindle | rpm | After 2% NaCl addition at 22° C. CPS | Visc. meas. Br. field LVT spindle | rpm | after 24 h at 22° C. CPS | Visc. meas. Br. field LVT spindle | rpm | after 24 h at 7° C. CPS | Visc. meas. Br. field LVT spindle | rpm |
|---|---|---|---|---|---|---|---|---|---|---|---|---|
| 0.5% X-7524, in tap water | 174 | 1 | 30 | 480 | 3 | 30 | 540 | 3 | 30 | 1020 | 3 | 30 |
| 0.5% X-7524, in ion-exch. water | 20 | 1 | 60 | 1860 | 3 | 30 | 1740 | 3 | 30 | 3020 | 3 | 30 |
| 0.75% X-7524, in tap water | 400 | 3 | 30 | 780 | 3 | 30 | 740 | 3 | 30 | 1320 | 3 | 30 |
| 0.75% X-7524, in ion-exch. water | 28.5 | 1 | 60 | 5000 | 4 | 30 | 4300 | 4 | 30 | 8000 | 4 | 30 |

Example 5

This example attempts to define the maximum use level of carrageenan using a range of salt concentrations.

Utilizing some amount of NaCl in solution before dissolution of carrageenan reduces viscosity permitting higher use levels of carrageenan, while keeping viscosity below the maximum viscosity that the brine preparation equipment and brine injectors can handle.

0.15 wt %, 0.25 wt %, 0.35 wt %, 0.50 wt % 1.00 wt %, 1.50 wt % and 2.00 wt % NaCl was dissolved in tap water at 20° C. Then 1 wt %, 2 wt %, 3 wt %, 4% wt or 5 wt % GENUGEL® carrageenan type X-7524 was added after the dissolution of the salt. Then 2 wt % NaCl was added.

In Table 7A to 7E below are the exact weight of each component used in the tests illustrated in the Tables.

TABLE 7A

| 1% X-7524 | first dissolved 0.15% NaCl | first dissolved 0.25% NaCl | first dissolved 0.35% NaCl | first dissolved 0.50% NaCl | first dissolved 1.00% NaCl | first dissolved 1.50% NaCl | first dissolved 2.00% NaCl |
|---|---|---|---|---|---|---|---|
| tap water, gr | 774.8 | 774 | 773.2 | 772 | 768 | 764 | 760 |
| first - NaCl, gr | 1.2 | 2 | 2.8 | 4 | 8 | 12 | 16 |
| Genugel X-7524, gr | 8 | 8 | 8 | 8 | 8 | 8 | 8 |
| second - NaCl, gr | 16 | 16 | 16 | 16 | 16 | 16 | 16 |

TABLE 7B

| 2% X-7524 | first dissolved 0.15% NaCl | first dissolved 0.25% NaCl | first dissolved 0.35% NaCl | first dissolved 0.50% NaCl | first dissolved 1.00% NaCl | first dissolved 1.50% NaCl | first dissolved 2.00% NaCl |
|---|---|---|---|---|---|---|---|
| tap water, gr | 766.8 | 766 | 765.2 | 764 | 760 | 756 | 752 |
| first - NaCl, gr | 1.2 | 2 | 28 | 4 | 8 | 12 | 16 |
| Genugel X-7524, gr | 16 | 16 | 16 | 16 | 16 | 16 | 16 |
| second - NaCl, gr | 16 | 16 | 16 | 16 | 16 | 16 | 16 |

TABLE 7C

| 3% X-7524 | first dissolved 0.15% NaCl | first dissolved 0.25% NaCl | first dissolved 0.35% NaCl | first dissolved 0.50% NaCl | first dissolved 1.00% NaCl | first dissolved 1.50% NaCl | first dissolved 2.00% NaCl |
|---|---|---|---|---|---|---|---|
| tap water, gr | 758.8 | 758 | 757.2 | 756 | 752 | 748 | 744 |
| first - NaCl, gr | 1.2 | 2 | 2.8 | 4 | 8 | 12 | 16 |
| Genugel X-7524, gr | 24 | 24 | 24 | 24 | 24 | 24 | 24 |
| second - NaCl, gr | 16 | 16 | 16 | 16 | 16 | 16 | 16 |

TABLE 7D

| 4% X-7524 | first dissolved 0.15% NaCl | first dissolved 0.25% NaCl | first dissolved 0.35% NaCl | first dissolved 0.50% NaCl | first dissolved 1.00% NaCl | first dissolved 1.50% NaCl | first dissolved 2.00% NaCl |
|---|---|---|---|---|---|---|---|
| tap water, gr | 750.8 | 750 | 749.2 | 748 | 744 | 740 | 736 |
| first - NaCl, gr | 1.2 | 2 | 2.8 | 4 | 8 | 12 | 16 |
| Genugel X-7524, gr | 32 | 32 | 32 | 32 | 32 | 32 | 32 |
| second - NaCl, gr | 16 | 16 | 16 | 16 | 16 | 16 | 16 |

TABLE 7E

| 5% X-7524 | first dissolved 0.15% NaCl | first dissolved 0.25% NaCl | first dissolved 0.35% NaCl | first dissolved 0.50% NaCl | first dissolved 1.00% NaCl | first dissolved 1.50% NaCl | first dissolved 2.00% NaCl |
|---|---|---|---|---|---|---|---|
| tap water, gr | 742.8 | 742 | 741.2 | 740 | 736 | 732 | 728 |
| first - NaCl, gr | 1.2 | 2 | 2.8 | 4 | 8 | 12 | 16 |
| Genugel X-7524, gr | 40 | 40 | 40 | 40 | 40 | 40 | 40 |
| second - NaCl, gr | 16 | 16 | 16 | 16 | 16 | 16 | 16 |

In Table 7F it can be seen that viscosity of most of the solutions could not be measured due to extreme viscosity or gelling of the solution. However, some of the solutions were measurable without difficulties and the measured values show clearly how, by adjusting the NaCl concentration in solution before addition of GENUGEL® carrageenan type X-7524, it is possible to choose any concentration of GENUGEL® carrageenan type X-7524 plus the desired end viscosity of the solution. This demonstrates one manner of being able to work with practically any carrageenan concentration desired, with the resulting solution still being injectable. As by dissolving, before the addition of carrageenan, the correct amount of NaCl, the resulting viscosity can be choosen, according to the carrageenan concentration choosen.

ing preparation of solutions to be injected or added to food products, while still maintaining the best possible functionality of the food treating compostion.

Tap water at 0° C., 5° C., 10° C. and 20° C., using ice to adjust the temperature, was utilized. GENUGEL® carrageenan type X-7524 at a 1 wt % concentration was added to the tap water without prior salt addition. After the carrageenan was dissolved, 2 wt % of salt was added.

In Table 8, below are the exact weight of each component used in example.

TABLE 7F

| | 1% X-7524 + 2% salt cps | Visc. meas. Br. field LVT spindle | rpm | 2% X-7524 + 2% salt cps | Visc. meas. Br. field LVT spindle | rpm | 3% X-7524 + 2% salt cps | Visc. meas. Br. field LVT spindle | rpm | 4% X-7524 + 2% salt cps | Visc. meas. Br. field LVT spindle | rpm | 5% X-7524 + 2% salt *cps | Visc. meas. Br. field LVT spindle | rpm |
|---|---|---|---|---|---|---|---|---|---|---|---|---|---|---|---|
| 0.15% salt before carr. | 620 | 3 | 30 | | | | | | | | | | | | |
| 0.25% salt befofe carr. | 65 | 1 | 60 | | | | | | | | | | | | |
| 0.35% salt before carr. | 13 | 1 | 60 | 13800 | 4 | 30 | | | | | | | | | |
| 0.50% salt before carr. | 6 | 1 | 60 | 1320 | 3 | 30 | | | | | | | | | |
| 1.00% salt before carr. | | | | | | | 1700 | 3 | 30 | | | | | | |
| 1.50% salt before carr. | | | | | | | 340 | 3 | 60 | 2260 | 3 | 30 | 10500 | 4 | 30 |
| 2.00% salt before carr. | | | | | | | 155 | 1 | 30 | 900 | 3 | 30 | 5200 | 4 | 30 |

*The missing measurements are for solutions that were too thick and/or gelled to measure.

FIGS. 1 shows a plot of viscosity vs. NaCl concentrations based on the results noted in Table 7F. FIG. 2 shows the relation between salt concentration (in solution before addition of carrageenan) and carrageenan concentration at a constant viscosity. This relation was made by extrapolation of the measured values from Table 7F, and is therefore not accurate but serves as an illustration of the relation between salt in solution and its effect on solubility of carrageenan added to the solution and the resulting viscosity.

Example 6

This example shows the influence of lower dissolution temperature on viscosity of food treating compositions.

The results from this test can also be used as a guidance for use level selection for polysaccharides, such as GENUGEL(V carrageenan type X-7524, in the case where lower dissolution temperatures are to be used in order to comply with possible legal restrictions on temperature dur-

TABLE 8

| | water at 0° C. | water at 5° C. | water at 10° C. | water at 20° C. |
|---|---|---|---|---|
| tap water, gr | 776 | 776 | 776 | 776 |
| NaCl, gr | 16 | 16 | 16 | 16 |
| Genugel X-7524, gr | 8 | 8 | 8 | 8 |

In Table 8A, the effect of lower dissolution temperature is clearly illustrated, by the step-wise lowering of viscosity caused by each step of lowering dissolution temperature.

TABLE 8A

| measurement in CPS | 1% X-7524 + 2% in 0° C. tap water | Visc. meas. Br. field LVT spindle | rpm | 1% X-7524 + 2% in 5° C. tap water | Visc. meas. Br. field LVT spindle | rpm | 1% X-7524 + 2% in 10° C. tap | Visc. meas. Br. field LVT spindle | rpm | 1% X-7524 + 2% in 20 C. tap water | Visc. meas. Br. field LVT spindle | rpm |
|---|---|---|---|---|---|---|---|---|---|---|---|---|
| immediately after preparation | 580 | 3 | 30 | 2720 | 3 | 30 | 3220 | 3 | 30 | 6500 | 4 | 30 |

Example 7

This example shows the influence of dissolution temperatures higher than 20° C. on viscosity of food treating compositions with GENUGEL® carrageenan type X-7524. The use of higher dissolution temperatures normally brings more of the polysaccharide into solution and thereby increases the yield obtainable from the polysaccharide used. The use of higher dissolution temperatures can therefore be used in order to reduce the use levels of polysaccharide, such as GENUGEL(B carrageenan type X-7524, compared with dissolution at 20° C., while still maintaining the same amount of functionality of the food treating composition in a food product.

This examples therefore determines the effect of dissolution temperatures above 20° C. on final viscosity of food treating compostions using GENUGEL® carrageenan type X-7524, as well as determines after which dissolution temperature the viscosity of the cooled down solution stops giving increases in viscosity, thereby indicating that the polysaccharide has been brought 100% into solution, and the temperature that acheives that goal.

0.5 wt % of GENUGEL® carrageenan type X-7524 was dissolved directly in the tap water at temperatures of 20° C., 30° C., 40° C., 50° C., 60° C., 70° C. After the GENUGEL® xarrageenan type X-7524, 2 wt % NaCl was added.

In Table 9, below are the exact weight of each component used in this example.

TABLE 9

|  | 20° C. tap water | 30° C. tap water | 40° C. tap water | 50° C. tap water | 60° C. tap water | 70° C. tap water |
|---|---|---|---|---|---|---|
| tab water, gr | 780 | 780 | 780 | 780 | 780 | 780 |
| NaCl, gr | 16 | 16 | 16 | 16 | 16 | 16 |
| Genugel X-7524, gr | 4 | 4 | 4 | 4 | 4 | 4 |

In Table 9A, there can be clearly seen the effect of higher dissolution temperatures on the solubility/viscosity of GENUGEL® carrageenan type X-7524. Still at 70° C., the GENUGEL® carrageenan type X-7524 food treating compostion is showing tendency of rising viscosity, therefore indicating that the GENUGEL® carrageenan type X-7524 is not 100% dissolved at this temperature. When the food treating compostion is measured at 22° C. (after 24 h at 22° C.), the rate of increase in viscosity slows down after 50° C. However, when the food treating composition is measured at 7° C. (after 24 h at 7° C.), the viscosity is still showing a very clear rising tendency even between solutions made at 60° C. and 70° C., signaling that still higher temperatures can increase the yield of GENUGEL® carrageenan type X-7524.

TABLE 9A

| measurement in CPS | 0.5% X-7524 + 2% salt in 20 C. tap water | Visc. meas. Br. field LVT spindle | rpm | 0.5% X-7524 + 2% salt in 30 C. tap water | Visc. meas. Br. field LVT spindle | rpm | 0.5% X-7524 + 2% salt in 40 C. tap water | Visc. meas. Br. field LVT spindle | rpm |
|---|---|---|---|---|---|---|---|---|---|
| after 24 h at 22° C. | 840 | 3 | 30 | 1400 | 3 | 30 | 1600 | 3 | 30 |
| after 24 h at 7° C. | 1520 | 3 | 30 | 3060 | 3 | 30 | 2960 | 3 | 30 |

| measurement in CPS | 0.5% X-7524 + 2% salt in 50 C. tap water | Visc. meas. Br. field LVT spindle | rpm | 0.5% X-7524 + 2% salt in 60 C. tap water | Visc. meas. Br. field LVT spindle | rpm | 0.5% X-7524 + 2% salt in 70 C. tap water | Visc. meas. Br. field LVT spindle | rpm |
|---|---|---|---|---|---|---|---|---|---|
| after 24 h at 22° C. | 2100 | 3 | 30 | 2380 | 3 | 30 | 2540 | 3 | 30 |
| after 24 h at 7° C. | 3680 | 3 | 30 | 4500 | 4 | 30 | 5100 | 4 | 30 |

Example 8

This example shows the temperature at which various carrageenan types start to hydrate or dissolve. This provides an indication of the temperature at which these carrageenan types give sufficient viscosity for preparation of a thixotropic food treating compostion. Thus, this example is being run to study similar functionality as with GENUGEL® carrageenan type X-7524, using other carrageenan types, by using dissolution temperatures higher than 20° C. This example studies temperatures at which GENUVISCO® type J, GENUGEL® Carrageenan type C-59, GENUGEL® Carrageenan type C-160, GENUGEL® Carrageenan type C-151 and GENUGEL® Carrageenan type C-209, start to hydrate and/or dissolve, giving similar viscosity as GENUGEL® Carrageenan type X-7524 does at 20° C.

Tap water, temp. 20° C., 30° C., 40° C., 50° C., 60° C., 70° C.

Carrageenan concentration 0.5 wt %.

Salt addition 2 wt %, after dissolution of carrageenan

Measurement of viscosity after 24 h, at 22C and 7C.

In Tables 10A–10F below are the exact weight of each component used in tests illustrated in Tables 10A-1 to 10F-1.

TABLE 10A

|  | 20° C. tap water | 30° C. tap water | 40° C. tap water | 50° C. tap water | 60° C. tap water | 70° C. tap water |
|---|---|---|---|---|---|---|
| tab water, gr | 780 | 780 | 780 | 780 | 780 | 780 |
| NaCl, gr | 16 | 16 | 16 | 16 | 16 | 16 |
| Genuvisco J, gr | 4 | 4 | 4 | 4 | 4 | 4 |

TABLE 10B

|  | 20° C. tap water | 30° C. tap water | 40° C. tap water | 50° C. tap water | 60° C. tap water | 70° C. tap water |
|---|---|---|---|---|---|---|
| tab water, gr | 780 | 780 | 780 | 780 | 780 | 780 |
| NaCl, gr | 16 | 16 | 16 | 16 | 16 | 16 |
| Genugel C-59, gr | 4 | 4 | 4 | 4 | 4 | 4 |

TABLE 10C

|  | 20° C. tap water | 30° C. tap water | 40° C. tap water | 50° C. tap water | 60° C. tap water | 70° C. tap water |
|---|---|---|---|---|---|---|
| tab water, gr | 780 | 780 | 780 | 780 | 780 | 780 |
| NaCl, gr | 16 | 16 | 16 | 16 | 16 | 16 |
| Genugel C-160, gr | 4 | 4 | 4 | 4 | 4 | 4 |

TABLE 10D

|  | 20° C. tap water | 30° C. tap water | 40° C. tap water | 50° C. tap water | 60° C. tap water | 70° C. tap water |
|---|---|---|---|---|---|---|
| tab water, gr | 780 | 780 | 780 | 780 | 780 | 780 |
| NaCl, gr | 16 | 16 | 16 | 16 | 16 | 16 |
| Genugel C-151, gr | 4 | 4 | 4 | 4 | 4 | 4 |

TABLE 10E

|  | 20° C. tap water | 30° C. tap water | 40° C. tap water | 50° C. tap water | 60° C. tap water | 70° C. tap water |
|---|---|---|---|---|---|---|
| tab water, gr | 780 | 780 | 780 | 780 | 780 | 780 |
| NaCl, gr | 16 | 16 | 16 | 16 | 16 | 16 |
| Genugel C-209, gr | 4 | 4 | 4 | 4 | 4 | 4 |

In Tables 10A-1 to 10F-1, it can be seen that each carrageenan type is quite specific regarding at which temperature it starts to hydrate or dissolve and give an increase in viscosity of the solution and at which temperature the viscosity stops increasing.

The temperature at which a carrageenan starts to show viscosity increase, measured in the cooled down solution at 20° C., is the minimum temperature at which that type of carrageenan needs to be added in order to achieve viscosity that can be utilized in a thixotropic food treating composition, this applies only to the same type of conditions under which the test was carried out, particularly regarding the water hardness and temperature.

And the temperature at which the carrageenan stops to give viscosity increase, measured in the cooled down solution at 20° C., is normally the temperature at which that particular carrageenan is fully in solution, for the type of conditions under which the test was carried out, particularly regarding the water hardness and temperature.

In all the tests 10A-1 to 10F-1, there was observable increase in viscosity and thixotropic gelling to one extent or another, when salt was added to the preparation, however test 10A-1 showed the lowest viscosity increase when salt was added. As the viscosity of the preparations were only measured after salt addition and cooling down to 20° C. and rest for 24 hours, there are no measured values to demonstrate the viscosity increase observed.

In Table 10A-1, GENUVISCO® carrageenan type J, only starts to show increase in viscosity after having been added to 40° C. or warmer tap water, which signals that this particular type of carrageenan starts to hydrate at 40° C. However this carrageenan continues to show a trend of increases in viscosity till the last measurement at 70° C., signaling that this type is still not fully in solution at 70° C., in tap water. Under the circumstances of this test the carrageenan tested is preferably added to water having a temperature of at least 40° C. for the best functionality in a thixotropic food treatment composition.

In Table 10B-1, GENUGEL® Carrageenan type C-59, shows the highest viscosity in solution prepared at 20° C., and sharply lower viscosities for solutions prepared at higher temperatures, signaling that this type of carrageenan is fully hydrated at 20° C.–30° C. under the conditions of this test. Under the circumstances of this test the carrageenan tested is preferably added to water having a temperature of 20° C. for the best functionality in a thixotropic food treatment composition.

In Table 10C-1, GENUGEL® Carrageenan type C-160, shows the highest viscosity in solution prepared at 20° C., and trend of slowly falling viscosities for solutions prepared at higher temperatures, signaling that this type of carrageenan is fully hydrated at 20° C. under the conditions of this test. Under the circumstances of this test the carrageenan tested is preferably added to water having a temperature of 20° C. for the best functionality in a thixotropic food treatment composition.

In Table 10D-1, GENUGEL® Carrageenan type C-151, shows the highest viscosity in solution prepared at 30° C., signaling that this type of carrageenan is fully hydrated at 30° C. under the conditions of this test. Where this carrageenan was added to water at a temperature of 40° C. and higher, all the resulting solutions gelled firmly making a sliceable gel, which could therefore not be measured for viscosity. Under the circumstances of this test the carrageenan tested is preferably added to water having a temperature of 30° C. for the best functionality in a thixotropic food treatment composition.

In Table 10E-1, 6E, GENUGEL® Carrageenan type C-209, shows high viscosity already at 20° C. and the viscosity continues to increase and that trend continues until the last measured solution at 70° C., which signals that this carrageenan is still not fully in solution at 70° C. Under the circumstances of this test the carrageenan tested is preferably added to water having as high temperature as possible for the best functionality in a thixotropic food treatment composition. This carrageenans optimum dissolution temperature is clearly above 70° C., under the conditions of this test.

TABLE 10A-1

| measurement in CPS | 0.5% Genuvisco J in 20 C. tap water + 2% salt | Visc. meas. Br. field LVT spindle | rpm | 0.5% Genuvisco J in 30 C. tap water + 2% salt | Visc. meas. Br. field LVT spindle | rpm | 0.5% Genuvisco J in 40 C. tap water + 2% salt | Visc. meas. Br. field LVT spindle | rpm |
|---|---|---|---|---|---|---|---|---|---|
| after 24 h at 22 C. | 4 | 1 | 60 | 7.5 | 1 | 60 | 280 | 3 | 30 |
| after 24 h at 7 C. | 5.5 | 1 | 60 | 11 | 1 | 60 | 640 | 3 | 30 |

| measurement in CPS | 0.5% Genuvisco J in 50 C. tap water + 2% salt | Visc. meas. Br. field LVT spindle | rpm | 0.5% Genuvisco J in 60 C. tap water + 2% salt | Visc. meas. Br. field LVT spindle | rpm | 0.5% Genuvisco J in 70 C. tap water + 2% salt | Visc. meas. Br. field LVT spindle | rpm |
|---|---|---|---|---|---|---|---|---|---|
| after 24 h at 22 C. | 1480 | 3 | 30 | 1900 | 3 | 30 | 2200 | 3 | 30 |
| after 24 h at 7 C. | 220 | 3 | 30 | 2860 | 3 | 30 | 3800 | 4 | 30 |

TABLE 10B-1

| measurement in CPS | 0.5% Genugel C-59 in 20 C. tap water + 2% salt | Visc. meas. Br. field LVT spindle | rpm | 0.5% Genugel C-59 in 30 C. tap water + 2% tap water | Visc. meas. Br. field LVT spindle | rpm | 0.5% Genugel C-59 in 40 C. tap water + 2% salt | Visc. meas. Br. field LVT spindle | rpm |
|---|---|---|---|---|---|---|---|---|---|
| after 24 h at 22 C. | 260 | 3 | 30 | 160 | 3 | 30 | 120 | 3 | 30 |
| after 24 h at 7 C. | 520 | 3 | 30 | 133 | 1 | 30 | 56 | 1 | 60 |

| measurement in CPS | 0.5% Genugel C-59 in 50 C. tap water + 2% salt | Visc. meas. Br. field LVT spindle | rpm | 0.5% Genugel C-59 in 60 C. tap water + 2% salt | Visc. meas. Br. field LVT spindle | rpm | 0.5% Genugel C-59 in 70 C. tap water + 2% salt | Visc. meas. Br. field LVT spindle | rpm |
|---|---|---|---|---|---|---|---|---|---|
| after 24 h at 22 C. | 50 | 3 | 60 | 54 | 1 | 60 | 60 | 1 | 60 |
| after 24 h at 7 C. | 81.5 | 1 | 60 | 118 | 1 | 30 | 73 | 1 | 60 |

TABLE 10C-1

| measurement in CPS | 0.5% Genugel C-160 in 20 C. tap water + 2% salt | Visc. meas. Br. field LVT spindle | rpm | 0.5% Genugel C-160 in 30 C. tap water + 2% salt | Visc. meas. Br. field LVT spindle | rpm | 0.5% Genugel C-160 in 40 C. tap water + 2% salt | Visc. meas. Br. field LVT spindle | rpm |
|---|---|---|---|---|---|---|---|---|---|
| after 24 h at 22 C. | 360 | 3 | 30 | 200 | 3 | 30 | 120 | 3 | 30 |
| after 24 h at 7 C. | 560 | 3 | 30 | 380 | 1 | 30 | 300 | 3 | 30 |

| measurement in CPS | 0.5% Genugel C-160 in 50° C. tap water + 2% salt | Visc. meas. Br. field LVT spindle | rpm | 0.5% Genugel C-160 in 60° C. tap water + 2% salt | Visc. meas. Br. field LVT spindle | rpm | 0.5% Genugel C-160 in 70° C. tap water + 2% salt | Visc. meas. Br. field LVT spindle | rpm |
|---|---|---|---|---|---|---|---|---|---|
| after 24 h at 22 C. | 240 | 3 | 30 | 220 | 3 | 30 | 200 | 3 | 30 |
| after 24 h at 7 C. | 480 | 3 | 30 | 380 | 3 | 30 | 360 | 3 | 30 |

TABLE 10D-1

| measurement in CPS | 0.5% Genugel C-151 in 20 C. tap water + 2% salt | Visc. meas. Br. field LVT spindle | rpm | 0.5% Genugel C-151 in 30 C. tap water + 2% salt | Visc. meas. Br. field LVT spindle | rpm | 0.5% Genugel C-151 in 40 C. tap water + 2% salt | Visc. meas. Br. field LVT spindle | rpm |
|---|---|---|---|---|---|---|---|---|---|
| after 24 h at 22 C. | 13 | 1 | 60 | 420 | 3 | 30 | | | |
| after 24 h at 7 C. | 15 | 1 | 60 | 500 | 3 | 30 | | | |

TABLE 10D-1-continued

| measurement in CPS | 0.5% Genugel C-151 in 50 C. tap water + 2% salt | Visc. meas. Br. field LVT spindle | rpm | 0.5% Genugel C-151 in 60 C. tap water + 2% salt | Visc. meas. Br. field LVT spindle | rpm | 0.5% Genugel C-151 in 70 C. tap water + 2% salt | Visc. meas. Br. field LVT spindle | rpm |
|---|---|---|---|---|---|---|---|---|---|
| after 24 h at 22 C. | | | | | | | | | |
| after 24 h at 7 C. | | | | | | | | | |

*With water at 40° C. or higher all the tests gelled, therefore no viscosity measurement possible.

TABLE 10E-1

| measurement in CPS | 0.5% Genugel C-209 in 20 C. tap water + 2% salt | Visc. meas. Br. field LVT spindle | rpm | 0.5% Genugel C-209 in 30 C. tap water + 2% salt | Visc. meas. Br. field LVT spindle | rpm | 0.5% Genugel C-209 in 40 C. tap water + 2% salt | Visc. meas. Br. field LVT spindle | rpm |
|---|---|---|---|---|---|---|---|---|---|
| after 24 h at 22 C. | 1850 | 3 | 30 | 2040 | 3 | 30 | 5150 | 3 | 12 |
| after 24 h at 7 C. | 2020 | 3 | 30 | 1380 | 3 | 30 | 4450 | 3 | 12 |

| measurement in CPS | 0.5% Genugel C-209 in 50 C. tap water + 2% salt | Visc. meas. Br. field LVT spindle | rpm | 0.5% Genugel C-209 in 60 C. tap water + 2% salt | Visc. meas. Br. field LVT spindle | rpm | 0.5% Genugelisco C- in 70 C. tap water + 2% salt | Visc. meas. Br. field LVT spindle | rpm |
|---|---|---|---|---|---|---|---|---|---|
| after 24 h at 22 C. | 12300 | 3 | 6 | 6700 | 4 | 30 | 11100 | 4 | 30 |
| after 24 h at 7 C. | 4450 | 3 | 12 | 1200 | 4 | 30 | 10500 | 4 | 30 |

Example 9

This example makes an attempt to illustrate, as well as the measurement methods allow, the shear thinning characteristic of the thixotropic food preparation, and the following re-gelation of the thixotropic food preparation. In this regard, this example tries to demonstrate better and in a more illustrative fashion, than Examples 3–8, the real degree of thixotropy seen when using using a preferred compostion in the thixotropic food treatment composition in industrial multi-needle injection equipment.

Objective

Measure the viscosity development and changes during preparation, shear thinning and re-gelation of a preferred compostion of the thixotropic food treatment composition, as described in Example 4.

Test Parameters

Tap water, temp. 20° C. and ion-exchanged water at 20° C.

Carrageenan concentration 0.5%.

Salt addition 2%, after dissolution of carrageenan

Measurement of viscosity before salt addition and immediately after shear thinning and after 5 min, 10 min, 30 min 60 min and 24 h at 22° C.

It is noted that for being able to get a more clear picture of the viscosity as it is immediately after shear-thinning and while the food treatment composition is still under agitation and therefore hindered in re-gelling, the measurement of viscosity for this point only, in this test, is measured differently than in other examples.

This change is simply that instead of letting the Brookfield Viscometer run for 60 seconds before measurement is taken, it will only be allowed to run 10 seconds before measurement, of the shear-thinned composition immetiately after shear-thinning, and measurement is started within 10 seconds after stopping shear stress. The reason for this is that while the Viscometer is running for 60 seconds, it is for the food treatment composition as it was resting as the Viscometer is a very low shear instrument, and therefore during the 60 seconds wait the composition is re-gelling and will therefore when read after 60 seconds not fully demonstrate the true viscosity as it is during agitiation and high shear.

In Table 11 below is the exact weight of each component used in the tests illustrated in Table 11-A.

TABLE 11

| | ion-exch. water | tap water |
|---|---|---|
| ion-exch. water, gr | 780 | |
| tap water, gr | | 780 |
| NaCl, gr | 16 | 16 |
| Genugel X-7524, gr | 4 | 4 |

Table 11A and FIG. 3 clearly illustrate the thixotropic behaviour of the food treatment composition, prepared according to the preferred embodiment of the thixotropic food treatment composition aspect of this invention.

Although for creating this illustration its attempted to acheive a reading for the food treating composition in its most liquid form, it must be mentioned that even with the reduced waiting time until reading is taken on the Brookfield Viscometer it cannot completly measure the viscosity as it is during high shear, as that viscosity is probably still lower than the measurements achieved with this change in the viscosity measurement method.

TABLE 11A

| measurement in CPS | 0,5% Genugel X-7524 in 20C ion-exch. water +2% NaCl | Visc. meas. Br.field LVT spindle | rpm | 0,5% Genugel X-7524 in 20C tap water +2% NaCl | Visc. meas. Br.field LVT spindle | rpm |
|---|---|---|---|---|---|---|
| before adding NaCl | 22 | 1 | 60 | 360 | 3 | 30 |
| after adding NaCl-before shearing | 1420 | 3 | 30 | 540 | 3 | 30 |
| immediately after shearing | 280 | 3 | 30 | 120 | 3 | 30 |
| after 5 min rest at 22C | 1020 | 3 | 30 | 500 | 3 | 30 |
| after 10 min rest at 22C | 1060 | 3 | 30 | 540 | 3 | 30 |
| after 30 min rest at 22C | 1080 | 3 | 30 | 580 | 3 | 30 |
| after 60 min rest at 22C | 980 | 3 | 30 | 540 | 3 | 30 |
| after 24 h rest at 22C | 980 | 3 | 30 | 480 | 3 | 30 |

Example 10

This example shows the viscosity of some un-gelled food treatment compositions, prepared with ion-exchanged water and GENUGEL Carrageenan type X-7524, GENUVISCO Carrageenan type X-0908 and GENU(G pectin type L-35 (low ester pectin). These solutions can both be injected into food products and incorporated using mixing or blending, for later gelling in-situ.

In Table 12, below are the exact weight of each component used in the tests illustrated in Table 12A.

TABLE 12

|  | 2.50% Genugel X-7524 | 5.00% Genuvisco X-0908 | 2.50% Genu Pectin L-35 | 5.00% Genu Pectin L-35 | 10.00% Genu Pectin L-35 |
|---|---|---|---|---|---|
| ion exch. water 20° C., gr | 780 | 760 | 780 | 760 | 720 |
| Genugel X-7524, gr | 20 |  |  |  |  |
| Genuvisco X-0908, gr |  | 40 |  |  |  |
| Genu Pectin L-35, gr |  |  | 20 | 40 | 80 |

TABLE

Lab 12A

| measurement in CPS | in 20C ion exch.water | Visc. meas. Br.field LVT spindle | rpm |
|---|---|---|---|
| Genugel X-7524-2,50% | 280 | 3 | 30 |
| Genuvisco Carrageenan X-0908-5,00% | 1100 | 4 | 30 |
| Genu Pectin L-35-2,50% | 21 | 1 | 60 |
| Genu Pectin L-35-5,00% | 130 | 1 | 30 |
| Genu Pectin L-35-10,00% | 2220 | 3 | 30 |

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process for treating an uncooked food product comprising at least one of meat, seafood and poultry, comprising adding to the uncooked food product an aqueous composition comprising a thixotropic gel which is capable of reforming from a shear thinned state subsequent to addition to the food product.

2. The process according to claim 1 wherein the thixotropic gel is reformed from a shear thinned state during storage of the food product.

3. A food product produced by the process according to claim 2.

4. A food product produced by the process according to claim 1.

5. The food product according to claim 4 wherein the food product comprises meat.

6. The food product according to claim 4 wherein the food product comprises seafood.

7. The food product according to claim 4 wherein the food product comprises poultry.

8. A process for treating an uncooked food product comprising at least one of meat, seafood and poultry, comprising adding to the uncooked food product an aqueous composition comprising a thixotropic gel, the thixotropic gel is shear thinned, and is added to the food product in a shear thinned condition.

9. The process according to claim 8 wherein the thixotropic gel is reformed from a shear thinned state during storage of the food product.

10. The process according to claim 8 wherein the thixotropic gel composition is formed by mixing water and a gellable polysaccharide under conditions so that the gellable polysaccharide is at least one of dissolved or hydrated, and mixing the at least one of dissolved or hydrated gellable polysaccharide with at least one gelling cation in an amount effective to form a thixotropic gel.

11. The process according to claim 10 wherein the water comprises at least one of tap water, distilled water, demineralized water, and de-ionized water.

12. The process according to claim 10 wherein the gelling cation comprises at least one salt.

13. The process according to claim 12 wherein the at least one salt comprises at least one of sodium chloride, potassium chloride, calcium chloride, sodium phosphate, potassium phosphate, salts of citric acid, salts of carbonic acid, and salts of tartaric acid.

14. The process according to claim 13 wherein the at least one salt comprises sodium chloride.

15. The process according to claim 10 wherein the gellable polysaccharide comprises at least one of carrageenans, carrageenans in combination with at least one of locust bean gum, cassia gum or konjac gum; xanthan gum; xanthan gum in combination with seed gums; meal or flour of seaweeds containing gelling polysaccharides, either untreated or treated; fruit or vegetable powder containing gelling polysaccharides; gelling pectin; gellan gum; alginates; and gelling starch.

16. The process according to claim 15 wherein the gelling polysaccharide is granulated or agglomerated.

17. The process according to claim 16 wherein the food product comprises meat.

18. The process according to claim 16 wherein the food product comprises poultry.

19. The process according to claim 16 wherein the food product comprises seafood.

20. A food product produced by the process according to claim 16.

21. The process according to claim 15 wherein the gellable polysaccharide comprises fruit or vegetable powder containing gelling polysaccharides, and the fruit or vegetable powder containing gelling polysaccharides comprises at least one of citrus peel powder, apple peel powder or the part of sugar beet, which remains after extraction of sugar.

22. The process according to claim 15 wherein the gellable polysaccharide comprises xanthan gum.

23. The process according claim 15 wherein the gellable polysaccharide comprises xanthan gum in combination with seed gums.

24. The process according to claim 15 wherein the gellable polysaccharide comprises low ester pectin.

25. The process according to claim 24 wherein the thixotropic gel is added to the food product by being injected into the food product.

26. A food product produced by the process according to claim 24.

27. The process according to claim 15 wherein the gellable polysaccharide comprises low ester pectin in combination with carrageenan.

28. The process according to claim 15 wherein the gellable polysaccharide comprises meal or flour of seaweeds containing gelling polysaccharides.

29. The process according to claim 28 wherein the meal or flour of seaweeds containing gelling polysaccharides comprises meal or flour of seaweed treated with alkali.

30. The process according to claim 28 wherein the meal or flour of seaweeds containing gelling polysaccharides comprises meal or flour of seaweed selected from the group consisting of *Eucheunia Spinosum, Eucheuma Cottonii, Chondrus Crispus*, Gigartina species, and Hypnea species.

31. The process according to claim 15 wherein the gellable polysaccharide comprises at least one of iota carrageenan, kappa carrageenan, xanthan gum and low ester pectins, and mixtures of these gellable polysaccharides with seed gums.

32. The process according to claim 10 wherein the gellable polysaccharide comprises iota carrageenan.

33. The process according to claim 32 wherein the thixotropic gel is added to the food product by being injected into the food product.

34. A food product produced by the process according to claim 32.

35. The process according to claim 10 wherein the gellable polysaccharide comprises at least one of iota, kappa and lambda carrageenan.

36. A food product produced by the process according to claim 35.

37. The process according to claim 10 wherein the gellable polysaccharide comprises at least one of iota and kappa carrageenan.

38. The process according to claim 37 wherein the thixotropic gel is added to the food product by being injected into the food product.

39. The process according to claim 10 wherein the gellable polysaccharide comprises a sodium carrageenan.

40. The process according to claim 39 wherein the thixotropic gel is added to the food product by being injected into the food product.

41. A food product produced by the process according to claim 39.

42. The process according to claim 10 wherein the water with which the gellable polysaccharide is mixed has a salt concentration of less than about 2 wt %.

43. The process according to claim 42 wherein the water with which the gellable polysaccharide is mixed has a salt concentration of less than about 1 wt %.

44. The process according to claim 43 wherein the water with which the gellable polysaccharide is mixed has a salt concentration of less than about 0.75 wt %.

45. The process according to claim 44 wherein the water with which the gellable polysaccharide is mixed has a salt concentration of less than about 0.5 wt %.

46. The process according to claim 10 wherein the thixotropic gel, when thinned sheared, has a viscosity of greater than the viscosity of distilled water to about 100,000 cps.

47. The process according to claim 10 wherein the thixotropic gel, when thinned sheared, has a viscosity of about 3 to 50,000 cps.

48. The process according to claim 47 wherein the thixotropic gel, when thinned sheared, has a viscosity of about 5 to 30,000 cps.

49. The process according to claim 48 wherein the thixotropic gel, when thinned sheared, has a viscosity of about 10 to 20,000 cps.

50. The process according to claim 49 wherein the thixotropic gel, when thinned sheared, has a viscosity of about 2,000 to 20,000 cps.

51. The process according to claim 10 wherein the thixotropic gel, when shear thinned, has a viscosity of less than about 2,000 cps.

52. The process according to claim 51 wherein the composition, when shear thinned, has a viscosity of less than about 1,500 cps.

53. The process according to claim 52 wherein the composition, when shear thinned, has a viscosity of less than about 1,000 cps.

54. The process according to claim 10 wherein the composition, when shear thinned, has a viscosity of greater than distilled water to about 1,000 cps.

55. The process according to claim 10 wherein the composition, when shear thinned, has a viscosity of about 3 to 900 cps.

56. The process according to claim 10 wherein the composition, when shear thinned, has a viscosity of about 5 to 800 cps.

57. The process according to claim 10 wherein the composition, when shear thinned, has a viscosity of about 10 to 800 cps.

58. The process according to claim 10 wherein the composition, when shear thinned, has a viscosity of about 20 to 800 cps.

59. The process according to claim 10 wherein after formation of the thixotropic gel additional polysaccharide is added.

60. The process according to claim 10 wherein the gellable polysaccharide comprises at least one carrageenan, and the at least one carrageenan is present in the thixotropic composition in a concentration up to about 10 wt %.

61. The process according to claim 10 wherein the at least one carrageenan is present in the thixotropic composition in a concentration up to about 5 wt %.

62. The process according to claim 61 wherein the at least one carrageenan is present in the thixotropic composition in a concentration of about 0.01 to 2 wt %.

63. The process according to claim 62 wherein the at least one carrageenan is present in the thixotropic composition in a concentration of about 0.1 to 1 wt %.

64. A food product produced by the process according to claim 10.

65. The process according to claim 8 further including at least one food additive.

66. The process according to claim 8 wherein the thixotropic gel is added to the food product by being injected into the food product.

67. The process according to claim 8 wherein the food product is shipped after treatment.

68. The process according to claim 8 wherein the food product is frozen after treatment.

69. The process according to claim 8 wherein the food product is permitted to drain after treatment.

70. The process according to claim 69 wherein where the draining is permitted for at least about 10 minutes after treatment.

71. The process according to claim 70 wherein the draining is permitted for at least about 20 minutes after treatement.

72. The process according to claim 70 wherein the draining is permitted for at least about 60 minutes after treatment.

73. The process according to claim 70 wherein the draining is permitted for about 10 to 20 minutes after treatment.

74. The process according to claim 69 wherein the draining is permitted for about 20 to 60 minutes.

75. A food product produced by the process according to claim 8.

76. The food product according to claim 75 wherein the food product comprises meat.

77. The food product according to claim 75 wherein the food product comprises seafood.

78. The food product according to claim 75 wherein the food product comprises poultry.

* * * * *